: (12) United States Patent
Kitamura et al.

(10) Patent No.: US 10,503,146 B2
(45) Date of Patent: Dec. 10, 2019

(54) CONTROL SYSTEM, CONTROL DEVICE, AND CONTROL METHOD

(71) Applicant: OMRON Corporation, Kyoto (JP)

(72) Inventors: Atsushi Kitamura, Kusatsu (JP); Takahiro Toku, Kusatsu (JP)

(73) Assignee: OMRON Corporation, Kyoto (JP)

( * ) Notice: Subject to any disclaimer, the term of this patent is extended or adjusted under 35 U.S.C. 154(b) by 59 days.

(21) Appl. No.: 15/871,104

(22) Filed: Jan. 15, 2018

(65) Prior Publication Data
US 2018/0275631 A1    Sep. 27, 2018

(30) Foreign Application Priority Data

Mar. 22, 2017 (JP) ................................ 2017-055423

(51) Int. Cl.
    *G05B 19/4067*      (2006.01)
    *G06K 9/32*      (2006.01)
    (Continued)

(52) U.S. Cl.
CPC .......... *G05B 19/4067* (2013.01); *B25J 9/163* (2013.01); *B25J 9/1653* (2013.01); *G05B 15/02* (2013.01);
(Continued)

(58) Field of Classification Search
CPC .. G05B 19/4067; G05B 15/02; G05B 19/058; G05B 19/404; G05B 23/02;
(Continued)

(56) References Cited

U.S. PATENT DOCUMENTS

2004/0028268 A1    2/2004   Popp et al.
2013/0190095 A1*   7/2013   Gadher ................. G06F 11/008
                                                                     463/42
(Continued)

FOREIGN PATENT DOCUMENTS

JP     2013-008111     1/2013
WO    2015030804     3/2015
WO    2016020905     2/2016

OTHER PUBLICATIONS

"Search Report of Europe Counterpart Application", dated Nov. 14, 2018, p. 1-p. 10.
European Search Opinion.

*Primary Examiner* — Thomas C Lee
*Assistant Examiner* — Anzuman Sharmin
(74) *Attorney, Agent, or Firm* — JCIPRNET

(57) ABSTRACT

A control system that can adjust a period required for detecting an abnormality occurring in a control object is provided. The control system includes: feature quantity creating means that creates a feature quantity from data which is acquired from the control object based on a first parameter associated with elements defining the feature quantity; deviation acquiring means that acquires a degree of deviation between the feature quantity created by the feature quantity creating means and a group of feature quantities stored by a storage means based on a second parameter associated with a range in the group of feature quantities; abnormality detecting means that detects an abnormality occurring in the control object based on the degree of deviation acquired by the deviation acquiring means and a threshold value; and instruction means that instructs the deviation acquiring means to start execution based on an execution cycle of the deviation acquiring means.

16 Claims, 18 Drawing Sheets

(51) Int. Cl.
*G05B 23/02* (2006.01)
*G05B 19/404* (2006.01)
*G05B 19/05* (2006.01)
*G05B 15/02* (2006.01)
*B25J 9/16* (2006.01)
*G05B 19/418* (2006.01)
*G06K 9/62* (2006.01)

(52) U.S. Cl.
CPC ......... *G05B 19/058* (2013.01); *G05B 19/404* (2013.01); *G05B 23/02* (2013.01); *G06K 9/3216* (2013.01)

(58) Field of Classification Search
CPC ..... G05B 23/0297; B25J 9/163; B25J 9/1653; G06K 9/3216; G06K 9/6215; G06K 9/627; G06K 9/6284
See application file for complete search history.

(56) References Cited

U.S. PATENT DOCUMENTS

| | | | |
|---|---|---|---|
| 2014/0005835 A1* | 1/2014 | Nishiyama ........... | G05B 19/056 700/275 |
| 2014/0222379 A1* | 8/2014 | Martinez Heras ... | G05B 23/024 702/188 |
| 2016/0144983 A1* | 5/2016 | Thuong ................ | G01M 17/00 701/31.7 |

* cited by examiner

DEGREE OF DEVIATION a > THRESHOLD VALUE a
and/or
DEGREE OF DEVIATION b < THRESHOLD VALUE b
} ⇒ HAVING ABNORMALITY

NUMBER OF DIMENSIONS : 6

LEARNING DATA

| $P_1$ | $P_{11}$ | $P_{12}$ | $P_{13}$ | $P_{14}$ | $P_{15}$ | $P_{16}$ |
|---|---|---|---|---|---|---|
| $P_2$ | $P_{21}$ | $P_{22}$ | $P_{23}$ | $P_{24}$ | $P_{25}$ | $P_{26}$ |
| $P_3$ | $P_{31}$ | $P_{32}$ | $P_{33}$ | $P_{34}$ | $P_{35}$ | $P_{36}$ |
| ⋮ | ⋮ | ⋮ | ⋮ | ⋮ | ⋮ | ⋮ |

FIG. 5A $$Div = \sqrt{\left(\frac{P_{11}-P_{x1}}{\sigma_1}\right)^2 + \left(\frac{P_{12}-P_{x2}}{\sigma_2}\right)^2 + \left(\frac{P_{13}-P_{x3}}{\sigma_3}\right)^2 + \text{---}}$$

FIG. 5B

CANDIDATE LIST STORAGE TABLE (DIAGNOSIS CYCLE IS SET TO 120 msec)

| PARAMETER | DIAGNOSIS CYCLE | k VALUE (1~20) | NUMBER OF DIMENSIONS (1~6) | FLAG | EXECUTION TIME (msec) | TIME EXCESS | ABNORMALITY DETECTION RATIO (%) | Total Score (0~100) | CANDIDATE |
|---|---|---|---|---|---|---|---|---|---|
| 1 | 120 | 15 | 3 | 0,1,2 | 150 | YES | 90 | 0 | – |
| 2 | 120 | 15 | 2 | 0,1 | 130 | YES | 70 | 0 | – |
| 3 | 120 | 12 | 3 | 0,1,2 | 110 | NO | 80 | 80 | 1 |
| 4 | 120 | 12 | 2 | 0,1 | 90 | NO | 65 | 75 | 3 |
| 5 | 120 | 10 | 4 | 0,1,2,3 | 115 | NO | 70 | 65 | 4 |
| 6 | 120 | 10 | 3 | 0,1,2 | 100 | NO | 65 | 70 | 2 |

ABNORMALITY DETECTION PARAMETER (WHICH CAN BE SET BY USER)

FIG. 15A

FEATURE QUANTITY CALCULATION FLAG TABLE

| FLAG | FEATURE QUANTITY PROCESSING |
|---|---|
| 0 | AVERAGE VALUE |
| 1 | STANDARD DEVIATION |
| 2 | DEGREE OF SKEWNESS |
| 3 | DEGREE OF KURTOSIS |
| 4 | MAXIMUM VALUE |
| 5 | MINIMUM VALUE |

FIG. 15B

CONTROL SYSTEM, CONTROL DEVICE, AND CONTROL METHOD

CROSS-REFERENCE TO RELATED APPLICATION

This application claims the priority benefits of Japan application serial no. 2017-055423, filed on Mar. 22, 2017. The entirety of the above-mentioned patent application is hereby incorporated by reference herein and made a part of this specification.

BACKGROUND

Technical Field

The disclosure relates to a control system, a control device, and a control method that detect an abnormality occurring in a control object.

Description of Related Art

Factory automation (FA) technology using a control device such as a programmable logic controller (PLC) has spread widely in various production fields. Such a control device needs to detect an abnormality occurring in a control object such as machine equipment.

With regard to this need, for example, Japanese Unexamined Patent Publication No. 2013-008111 (Patent Document 1) discloses an abnormality sign diagnosing device that diagnoses an abnormality sign of machine equipment. The abnormality sign diagnosing device disclosed in Patent Document 1 functions to store data acquired by a sensor during normal operation of the machine equipment as learning data in advance and to diagnose an abnormality sign of the machine equipment on the basis of data serving as a diagnosis object which is newly acquired by the sensor and the learning data.

According to the configuration disclosed in Patent Document 1, an abnormality sign of machine equipment can be diagnosed, but adjustment of a period of time required for diagnosing the abnormality sign is not taken into consideration.

SUMMARY

The disclosure provides a technique that can adjust a period of time required for detecting an abnormality occurring in a control object.

According to an embodiment of the disclosure, there is provided a control system including a control device that controls a control object. The control system includes: storage means that stores a group of feature quantities which are generated from data acquired from the control object and which are defined by one or more elements; feature quantity creating means that generates a feature quantity from data which is acquired from the control object on the basis of a first parameter associated with the number of elements defining the feature quantity; deviation acquiring means that acquires a degree of deviation between the feature quantity created by the feature quantity creating means and the group of feature quantities stored by the storage means on the basis of a second parameter associated with a range in the group of feature quantities which is used to acquire the degree of deviation; abnormality detecting means that detects an abnormality occurring in the control object on the basis of the degree of deviation acquired by the deviation acquiring means and a threshold value; and instruction means that instructs the deviation acquiring means to start execution on the basis of an execution cycle of the deviation acquiring means. A value of at least one of the first parameter and the second parameter is changeable.

According to another embodiment of the disclosure, there is provided a control device that controls a control object. The control device includes: storage means that stores a group of feature quantities which are generated from data acquired from the control object and which are defined by one or more elements; feature quantity creating means that generates a feature quantity from data which is acquired from the control object on the basis of a first parameter associated with the number of elements defining the feature quantity; deviation acquiring means that acquires a degree of deviation between the feature quantity created by the feature quantity creating means and the group of feature quantities stored by the storage means on the basis of a second parameter associated with a range in the group of feature quantities which is used to acquire the degree of deviation; abnormality detecting means that detects an abnormality occurring in the control object on the basis of the degree of deviation acquired by the deviation acquiring means and a threshold value; and instruction means that instructs the deviation acquiring means to start execution on the basis of an execution cycle of the deviation acquiring means. A value of at least one of the first parameter and the second parameter is changeable.

According to another embodiment of the disclosure, there is provided a control method of controlling a control object. The control method includes: a step of creating a feature quantity from data which is acquired from the control object on the basis of a first parameter associated with the number of elements defining the feature quantity; a step of acquiring a degree of deviation between the created feature quantity and a group of feature quantities which are stored by storage means on the basis of a second parameter associated with a range in the group of feature quantities which is used to acquire the degree of deviation; a step of detecting an abnormality occurring in the control object on the basis of the acquired degree of deviation and a threshold value; and a step of starting acquisition of the degree of deviation on the basis of an execution cycle of the acquisition of the degree of deviation. A value of at least one of the first parameter and the second parameter is changeable.

According to the disclosure, it is possible to adjust a period of time required for detecting an abnormality occurring in a control object.

BRIEF DESCRIPTION OF THE DRAWINGS

FIGS. 5A and 5B are diagrams schematically illustrating an example of diagnosis based on a Mahalanobis distance which is used in the control system according to the embodiment.

FIGS. 15A and 15B are diagrams illustrating an example of a candidate list which is created by the control system according to the embodiment.

DESCRIPTION OF THE EMBODIMENTS

Figure 1:
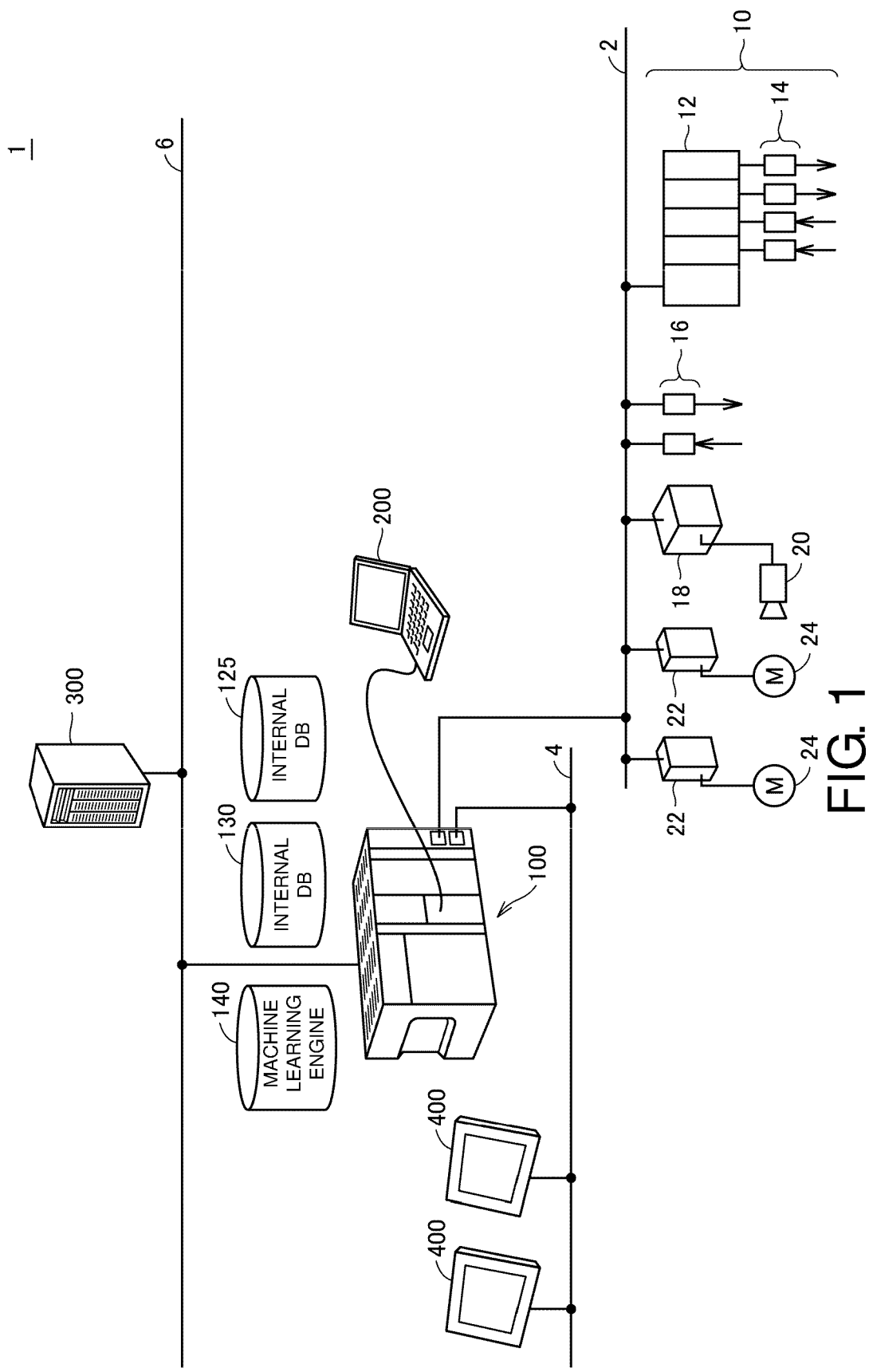
FIG. 1 is a diagram schematically illustrating an example of an entire configuration of a control system according to an embodiment of the disclosure.

An embodiment of the disclosure will be described below in detail with reference to the accompanying drawings. The same or corresponding elements in the drawings will be referenced by the same reference signs and description thereof will not be repeated.

A. Example of Entire Configuration of Control System

First, an example of an entire configuration of a control system 1 including a control device according to an embodiment of the disclosure will be described below. FIG. 1 is a diagram schematically illustrating an example of an entire configuration of the control system 1 according to the embodiment.

Referring to FIG. 1, the control system 1 according to the embodiment includes a control device 100 that controls a control object and a support device 200 that is connected to the control device 100 as main elements.

The control device 100 may be embodied as a type of computer such as a PLC. The control device 100 is connected to a field device group 10 via a first field network 2 and is connected to one or more display devices 400 via a second field network 4.

The control device 100 is connected to a data logging device 300 via a local network 6. The control device 100 transmits and receives data to and from devices connected thereto via the networks. The data logging device 300 and the display device 400 are optional and are not essential to the control system 1.

The control device 100 includes a control logic (hereinafter also referred to as a "PLC engine") that performs various arithmetic operations for controlling machine equipment. In addition to the PLC engine, the control device 10 has a collection function of collecting data (hereinafter also referred to as "input data") which is measured by the field device group 10 and is transmitted to the control device 100. The control device 100 also has an abnormality detecting function of detecting an abnormality occurring in a control object on the basis of the collected input data.

Specifically, an internal database (hereinafter also referred to as an "internal DB") 130 which is mounted in the control device 100 provides the collection function, and a machine learning engine 140 which is mounted in the control device 100 provides the abnormality detecting function. An internal database (an internal DB) 125 which is mounted in the control device 100 stores learning results which are used for the machine learning engine 140 to detect an abnormality. Details of the internal DB 125, the internal DB 130, and the machine learning engine 140 will be described later.

For example, networks that enable fixed-cycle communication in which an arrival time of data is guaranteed be employed as the first field network 2 and the second field network 4. As such a network that enables fixed-cycle communication, EtherCAT (registered trademark), EtherNet/IP (registered trademark), DeviceNet (registered trademark), CompoNet (registered trademark), and the like are known.

The field device group 10 includes devices that collect input data from a control object or manufacturing equipment and a production line (hereinafter generically referred to as a "field") associated with control. Examples of such devices that collect input data include an input relay and various sensors.

The field device group 10 includes devices that apply a certain action to the field on the basis of a command (hereinafter also referred to as "output data") generated from the control device 100. Examples of such devices that apply a certain action to the field include an output relay, a contactor, a servo driver, a servo motor, and arbitrary actuators. The field device group 10 transmits and receives data including input data and output data to and from the control device 100 via the first field network 2.

In the example of the configuration illustrated in FIG. 1, the field device group 10 includes a remote input/output (I/O) device 12, a relay group 14, an image sensor 18, a camera 20, a servo driver 22, and a servo motor 24.

The remote I/O device 12 includes a communication unit that performs communication via the first field network 2 and an input/output unit (hereinafter referred to as an "I/O unit") that receives input data and outputs output data. Input data and output data are transmitted between the control device 100 and the field via such an I/O unit. FIG. 1 illustrates an example in which digital signals are transmitted and received as input data and output data via the relay group 14.

The I/O unit may be connected directly to the field network. FIG. 1 illustrates an example in which the I/O unit 16 is connected directly to the first field network 2.

The image sensor 18 performs an image measuring process such as pattern matching on image data imaged by a camera 20 and transmits the process result to the control device 100.

The servo driver 22 drives the servo motor 24 in accordance with output data (for example, a position command) from the control device 100.

As described above, the control device 100 and the field device group 10 transmit and receive data (exchange data) to and from each other via the first field network 2, and the transmitted and received data (the exchanged data) is updated with a very short cycle of the order of several hundred μsec (order) ($10^{-6}$ seconds) to several tens of msec (order) ($10^{-3}$ seconds). The process of updating the transmitted and received data may be referred to as an "I/O refreshing process."

The display device 400 that is connected to the control device 100 via the second field network 4 receives an operation from a user, transmits a command or the like in response to the user's operation to the control device 100, and graphically displays a calculation result or the like in the control device 100.

The data logging device 300 is connected to the control device 100 via the local network 6 and transmits and receives (exchanges) necessary data to and from the control device 100. The data logging device 300 has, for example, a database function and collects an event log and the like generated from the control device 100 in a time series.

A general-purpose protocol such as Ethernet (registered trademark) may be mounted in the local network 6. That is, typically, a data transmission cycle or a data update cycle in the local network 6 may be longer than a data transmission cycle or a data update cycle in the field network (the first field network 2 and the second field network 4). Here, the local network 6 may be able to transmit more data at a time than the field network.

The support device 200 is a device that supports preparation required for the control device 100 to control a control object. Specifically, the support device 200 provides a development environment of a program (such as a program preparation editing tool, a parser, and a compiler) which is executed in the control device 100, a setting environment in which parameters (configuration) of the control device 100 and various devices connected to the control device 100 are set, a function of transmitting a created user program to the control device 100, and a function of correcting and modifying a user program or the like which is executed in the control device 100 on-line.

The support device 200 according to the embodiment has functions of performing a setting operation on the internal DB 130 and the machine learning engine 140 mounted in the control device 100. These functions will be described later.

B. Example of Hardware Configuration of Each of the Devices

An example of hardware configurations of principal devices constituting the control system 1 according to the embodiment will be described below.

<b1: Example of Hardware Configuration of Control Device 100>

Figure 2:
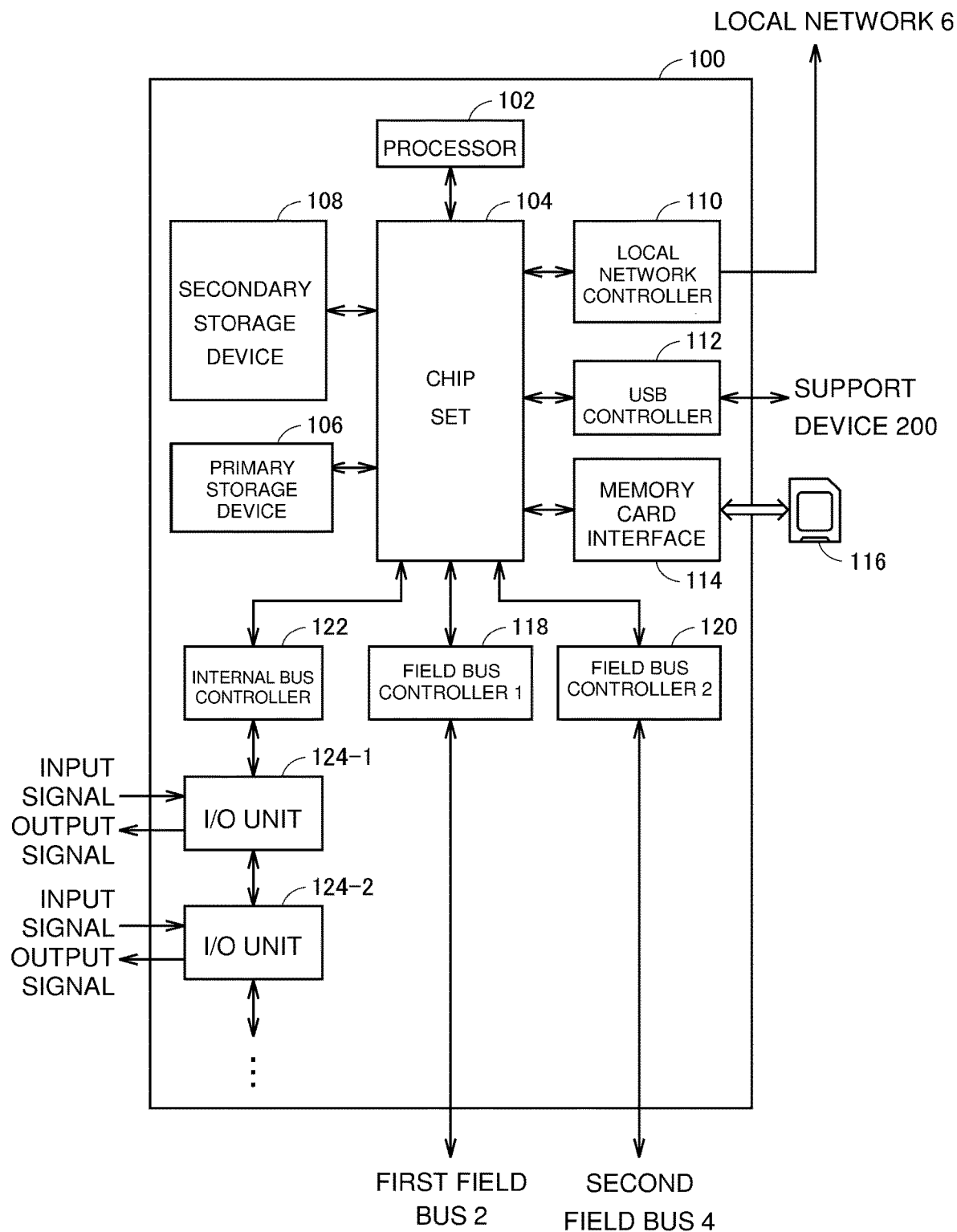
FIG. 2 is a block diagram illustrating an example of a hardware configuration of a control device constituting the control system according to the embodiment.

FIG. 2 is a block diagram illustrating an example of a hardware configuration of the control device 100 constituting the control system 1 according to the embodiment.

Referring to FIG. 2, the control device 100 includes a processor 102 such as a central processing unit (CPU) or a micro-processing unit (MPU), a chip set 104, a primary storage device 106, a secondary storage device 108, a local network controller 110, a Universal Serial Bus (USB) controller 112, a memory card interface 114, an internal bus controller 122, field bus controllers 118 and 120, and I/O units 124-1, 124-2, . . . .

The processor 102 implements control for a control object and various processes which will be described later by reading various programs stored in the secondary storage device 108, loading the read programs into the primary storage device 106, and executing the programs. The chip set 104 implements overall processes of the control device 100 by controlling the processor 102 and the other components.

In addition to a system program for implementing the PLC engine, a user program which is executed using the PLC engine is stored in the secondary storage device 108. Programs for implementing the internal DB 125, the internal DB 130, and the machine learning engine 140 are also stored in the secondary storage device 108.

The local network controller 110 controls transmission and reception of data to and from another device via the local network 6. The USB controller 112 controls transmission and reception of data to and from the support device 200 via USB connection.

The memory card interface 114 is configured to enable a memory card 116 to be detachably attached thereto, and is configured to be able to write data to the memory card 116 and to read various data (such as a user program and trace data) from the memory card 116.

The internal bus controller 122 is an interface that transmits and receives data to and from the I/O units 124-1, 124-2, . . . which are mounted in the control device 100.

The field bus controller 118 controls transmission and reception of data to and from another device via the first field network 2. Similarly, the field bus controller 120 controls transmission and reception of data to and from another device via the second field network 4.

FIG. 2 illustrates an example in which necessary functions are provided by causing the processor 102 to execute a program, but some or all of the functions to be provided may be mounted using a dedicated hardware circuit (for example, an application specification integrated circuit (ASIC) or a field-programmable gate array (FPGA)). Alternatively, principal parts of the control device 100 may be implemented using hardware based on a general-purpose architecture (for example, an industrial PC based on a general-purpose PC). In this case, a plurality of operating systems (OSs) having different purposes may be executed in parallel and applications necessary for the OSs may be executed using virtualization technology.

<b2: Example of Hardware Configuration of Support Device 200>

Figure 3:
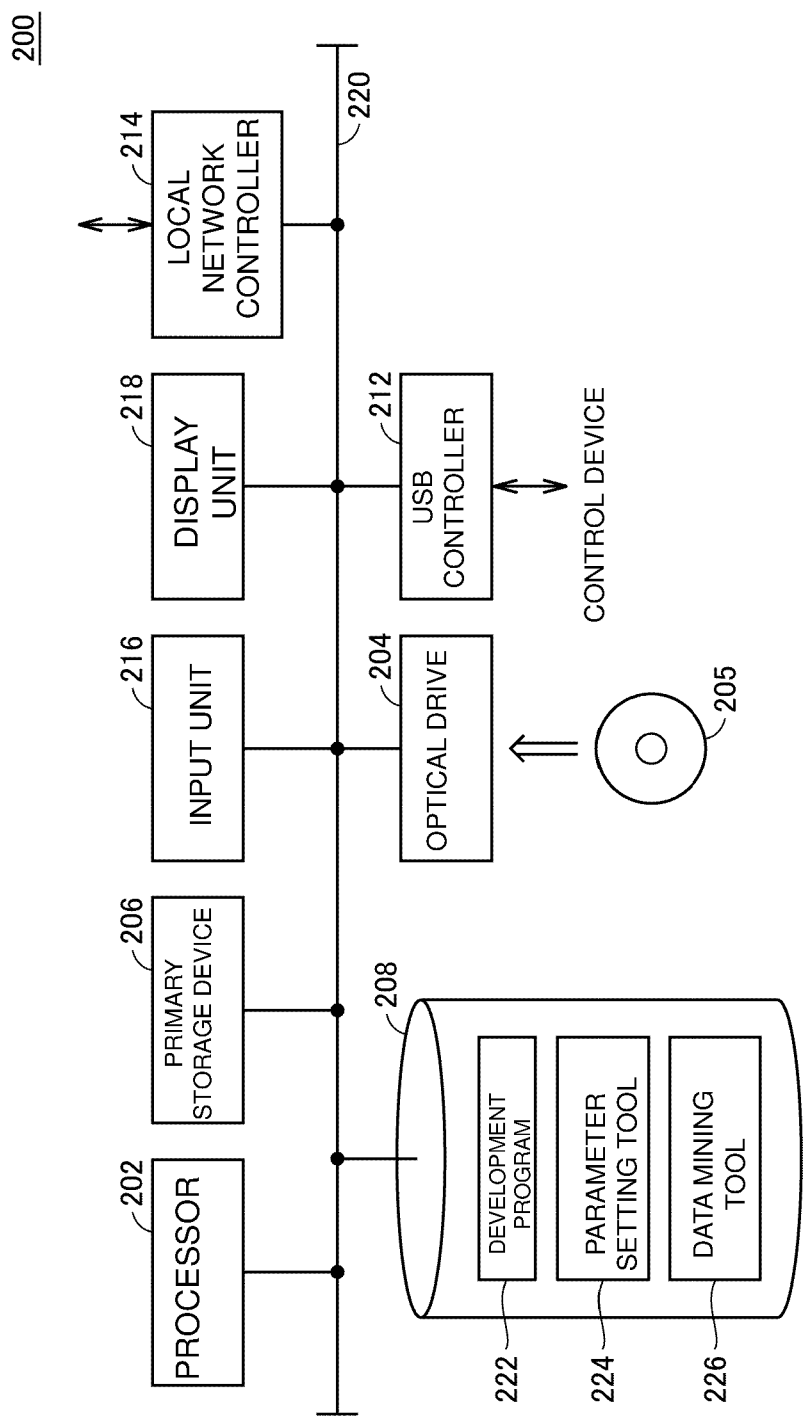
FIG. 3 is a block diagram illustrating an example of a hardware configuration of a support device constituting the control system according to the embodiment.

The support device 200 according to the embodiment is implemented, for example, by executing a program using hardware (for example, a general-purpose PC) based on general-purpose architectures. FIG. 3 is a block diagram illustrating an example of a hardware configuration of the support device 200 constituting the control system 1 according to the embodiment.

Referring to FIG. 3, the support device 200 includes a processor 202 such as a CPU or an MPU, an optical drive 204, a primary storage device 206, a secondary storage device 208, a USB controller 212, a local network controller 214, an input unit 216, and a display unit 218. These components are connected via a bus 220.

The processor 202 implements various processes which will be described later by reading various programs stored in the secondary storage device 208, loading the read programs into the primary storage device 206, and executing the programs.

The secondary storage device 208 includes, for example, a hard disk drive (HDD) or a flash solid state drive (SSD). The secondary storage device 208 typically stored a development program 222 which is for creating a user program which is executed in the support device 200, debugging the created program, defining a system configuration, and setting various parameters. A parameter setting tool 224 that sets various parameters and designates a variable serving as an object of machine learning is stored in the secondary storage device 208. A data mining tool 226 that extracts target information from data (raw data which will be described later) which is collected by the control device 100 is also stored in the secondary storage device 208. An OS and other necessary programs may be stored in the secondary storage device 208.

The support device 200 includes the optical drive 204. A program stored in a recording medium 205 (for example, an optical recording medium such as a digital versatile disc (DVD)) that non-transitorily stores a computer-readable program is read from the recording medium and is installed in the secondary storage device 208 or the like.

Various programs which are executed in the support device 200 may be installed via the computer-readable recording medium 205, or may be installed in a download manner from a server device over a network. Functions which are provided by the support device 200 according to the embodiment may be implemented by using some modules which are provided by an OS.

The USB controller 212 controls transmission and reception of data to and from the control device 100 via USB connection. The local network controller 214 controls transmission and reception of data to and from another device via an arbitrary network.

The input unit 216 includes a keyboard and a mouse and receives a user operation. The display unit 218 includes a display, various indicators, a printer, and the like, and the display unit 218 outputs process results and the like coming from the processor 202.

FIG. 3 illustrates an example in which necessary functions are provided by causing the processor 202 to execute a program, but some or all of the functions may be mounted using a dedicated hardware circuit (for example, an ASIC or an FPGA).

<b3: Example of Hardware Configuration of Data Logging Device 300>

The data logging device 300 constituting the control system 1 according to the embodiment can be implemented, for example, using a general-purpose file server or a database server. The hardware configuration of such a device is known and thus will not be described in detail herein.

<b4: Example of Hardware Configuration of Display Device 400>

The display device 400 constituting the control system 1 according to the embodiment is called a human-machine interface (HMI), and may employ a configuration mounted as a dedicated device or may be embodied using hardware according to a general-purpose architecture (for example, an industrial PC based on a general-purpose PC).

C. Outline of Abnormality Detection Performed by Control System 1

An outline of abnormality detection which is performed by the control system 1 according to the embodiment will be described below.

In the control system 1 according to the embodiment, the control device 100 performs a raw data collecting process as a pre-process before abnormality detection is performed. In the raw data collecting process, the control device 100 writes data (hereinafter also referred to as "raw data") which is used for interpretation (analysis) associated with the abnormality detection among input data to the internal DB 130.

Then, the control device 100 performs a preparation process. In the preparation process, the control device 100 creates a feature quantity from the raw data written to the internal DB 130. At this moment, the control device 100 creates the feature quantity on the basis of elements for defining the feature quantity.

An element for defining a feature quantity serves as a reference for expressing a feature of raw data and examples thereof include an average, a standard deviation, a degree of skewness, a degree of kurtosis, a maximum value, and a minimum value, and the like.

When an averaging process is performed on the raw data, the control device 100 calculates a center (an average value) of a data distribution (corresponding to the raw data) as a feature quantity. When a standard deviation calculating process is performed on the raw data, the control device 100 calculates a degree of deviation from the average value in the data distribution as a feature quantity. When a skewness calculating process is performed on the raw data, the control device 100 calculates a degree of skewness of the data distribution as a feature quantity. When a kurtosis calculating process is performed on the raw data, the control device 100 calculates a degree of kurtosis of the data distribution as a feature quantity. When a maximum value calculating process is performed on the raw data, the control device 100 calculates a maximum value of the data distribution as a feature quantity. When a minimum value calculating process is performed on the raw data, the control device 100 calculates a minimum value of the data distribution as a feature quantity.

In this way, by creating a feature quantity, which is defined by the elements, from the raw data written to the internal DB 130, the control device 100 can understand (catch) behavior of a control object such as machine equipment in a time series.

For each piece of raw data, a feature quantity is defined by one or more elements. A feature quantity defined by the elements can be expressed as a vector. This is also referred to as a "feature vector." The number of dimensions of a feature vector is the same as the number of elements defining the feature quantity. For example, when a feature quantity is defined by two elements, the number of dimensions of the feature vector is 2. When a feature quantity is defined by four elements, the number of dimensions of the feature vector is 4. As the number of dimensions of a feature vector becomes greater, the control device 10 can more accurately understand the feature of the raw data.

In the preparation process, types of the elements (such as an average, a standard deviation, a degree of skewness, a degree of kurtosis, a maximum value, and a minimum value) defining a feature quantity may be all types which can be used in the control system 1 or may be set as parameters by a user. In the preparation process, the number of elements (the number of dimensions of a feature vector) defining a feature quantity may be all numbers which can be used in the control system 1 or may be set as parameters by a user.

In the preparation process, the control device 100 stores a group of feature quantities which are created by data acquired from a control object and which are defined by one or more elements.

Specifically, the control device 100 collects feature quantities created in a predetermined period of time and writes a group of the created feature quantities to the internal DB 125. The control device 100 performs machine learning on the group of features. For example, by performing machine learning, the control device 100 clusters the group of feature quantities and classifies the feature quantities into one or more clusters. The control device 100 writes a learning result acquired from the machine learning to the internal DB 125. The feature quantities acquired as the learning result is also referred to as "learning data." The control device 100 determines a threshold value which is used for the abnormality detection based on the learning result of the machine learning.

When the learning result and the threshold value are acquired in the preparation process, the control device 100 performs an abnormality detecting process by using the acquired values (e.g., learning result and the threshold value). In the abnormality detecting process, the control device 100 creates a feature quantity for each predetermined cycle or for each predetermined event.

At this time, the control device 100 creates a feature quantity on the basis of a first parameter associated with the elements defining the feature quantity. The first parameter is a parameter for setting the types of the elements (such as an average, a standard deviation, a degree of skewness, a degree of kurtosis, a maximum value, and a minimum value) and the number of the elements (the number of dimensions of the feature vector) which define the feature quantity. A user can set the value of the first parameter by using the support device 200.

In the abnormality detecting process, the control device 100 acquires a degree of deviation between the created feature quantity and the group of feature quantities written as the learning result to the internal DB 125. The control device 100 detects an abnormality occurring in a control object on the basis of the acquired degree of deviation and the threshold value determined in the preparation process.

Figures 4A, 4B:
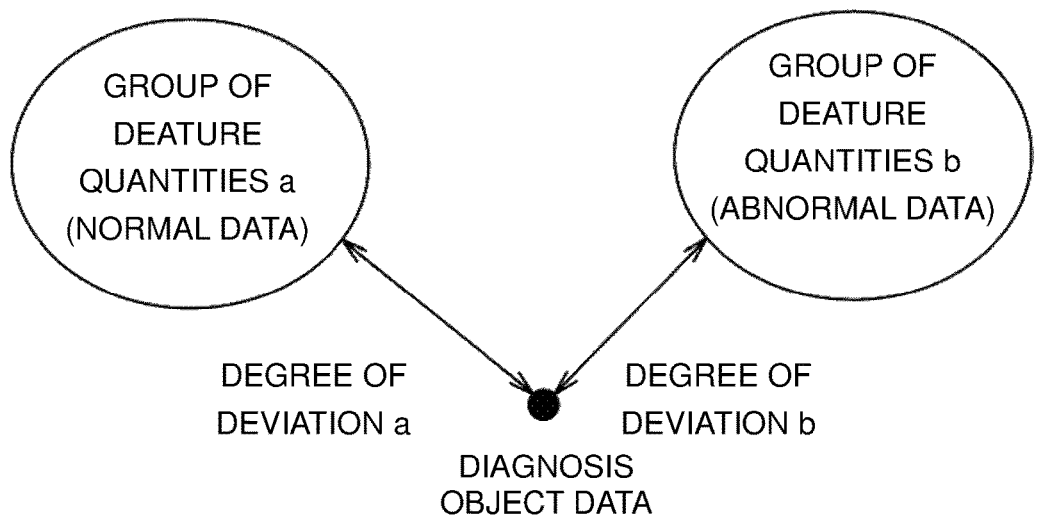
FIGS. 4A and 4B are diagrams schematically illustrating a degree of deviation in detecting an abnormality using the control system according to the embodiment.

Abnormality detection will be described below with reference to FIGS. 4A-4B and 5A-5B. FIG. 4A-4B are diagrams schematically illustrating a degree of deviation in the abnormality detection using the control system 1 according to the embodiment.

Referring to FIG. 4A, when the group of feature quantities is clustered by the machine learning, the group of feature quantities is classified into a group of feature quantities a (feature quantities group a) of normal data (learning data); and a group of feature quantities b (feature quantities group b) of abnormal data (learning data).

The control device 100 uses a Mahalanobis distance for acquiring a degree of deviation. Specifically, the control device 100 calculates a degree of deviation (a degree of deviation a and a degree of deviation b) on the basis of distances between data of a feature quantity which is a diagnosis object of the abnormality detection (hereinafter also referred to as "diagnosis object data") and k feature quantities included in the groups of feature quantities a and b.

At this time, the control device 100 acquires the degree of deviation on the basis of a second parameter associated with a range of the group of feature quantities which is used to acquire the degree of deviation. The second parameter is a parameter for setting the number of feature quantities (hereinafter also referred to as a "k value") which are used to calculate the degree of deviation from the diagnosis object data. A user can set the value of the second parameter by using the support device 200. As the number of k values becomes greater, the number of pieces of learning data which are compared with the diagnosis object data becomes greater (for calculating the degree of deviation).

Referring to FIG. 4B, when the degree of deviation a is greater than a threshold value a and the degree of deviation b is less than a threshold value b, the control device 100 determines that the diagnosis object data is abnormal. Alternatively, when the degree of deviation a is greater than the threshold value a or the degree of deviation b is less than the threshold value b, the control device 100 determines that the diagnosis object data is abnormal.

FIGS. 5A and 5B are diagrams schematically illustrating an example of diagnosis using the Mahalanobis distance which is used in the control system 1 according to the embodiment.

As illustrated in FIG. 5A, feature quantities of a plurality of pieces of learning data P1, P2, P3, . . . are calculated for each dimension of the feature vectors. For example, as for the learning data, P1, P11, P12, P13, P14, P15, and P16 are calculated as feature quantities respectively corresponding to six dimensions. The plurality of pieces of learning data are stored in a table in a descending order of reliabilities based on a predetermined criterion. As the reliability becomes higher, abnormality detection accuracy becomes higher. A Mahalanobis distance Div between the diagnosis object data PX (Px1, Px2, Px3, . . . ) and the learning data is calculated by an expression illustrated in FIG. 5B. Here, a denotes a standard deviation of a plurality of pieces of learning data for each dimension. When the diagnosis object data is abnormal, the Mahalanobis distance between the diagnosis object data and the learning data is larger than that when the diagnosis object data is normal. Accordingly, the Mahalanobis distance acquired when the diagnosis object data is abnormal is larger than the Mahalanobis distance when the diagnosis object data is normal. Accordingly, depending on the method of determining the threshold value, the Mahalanobis distance is not greater than the threshold value when the diagnosis object data is normal, but the Mahalanobis distance is greater than the threshold value when the diagnosis object data is abnormal.

In this way, the control device 100 acquires a degree of deviation between the learning data in at least one case of a normal case and an abnormal case and the diagnosis object data, and detects an abnormality occurring in a control object on the basis of the acquired degree of deviation and the threshold value. In addition, the control device 100 may detect an abnormality occurring in a control object using a known neighborhood method such as an Euclidean distance.

Figure 6A:
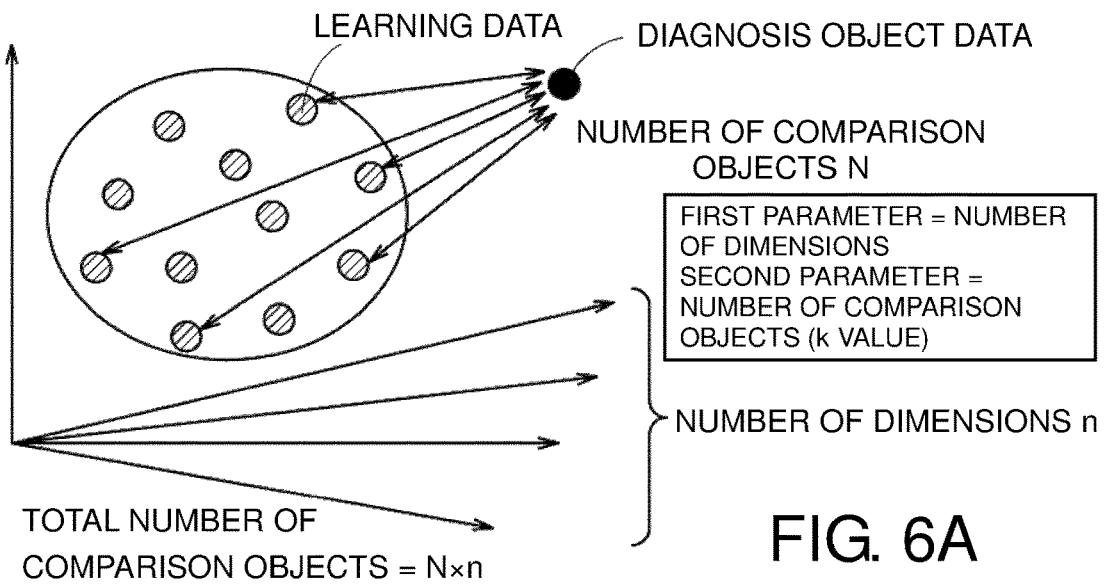
FIG. 6A to 6C are diagrams schematically illustrating changes of a deviation acquisition time in the control system according to the embodiments.
Figure 6B:
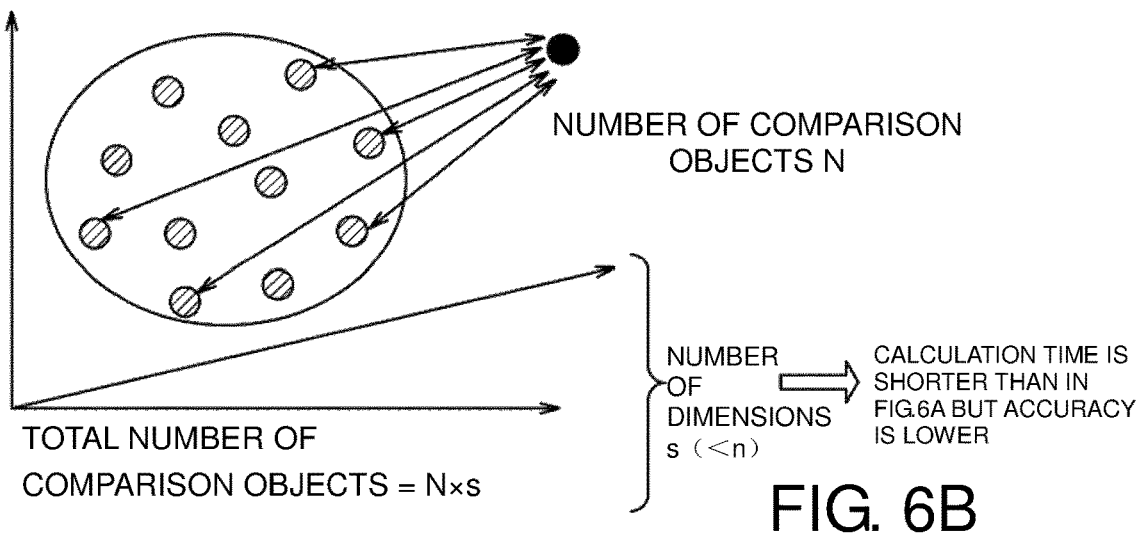
Figure 6C:
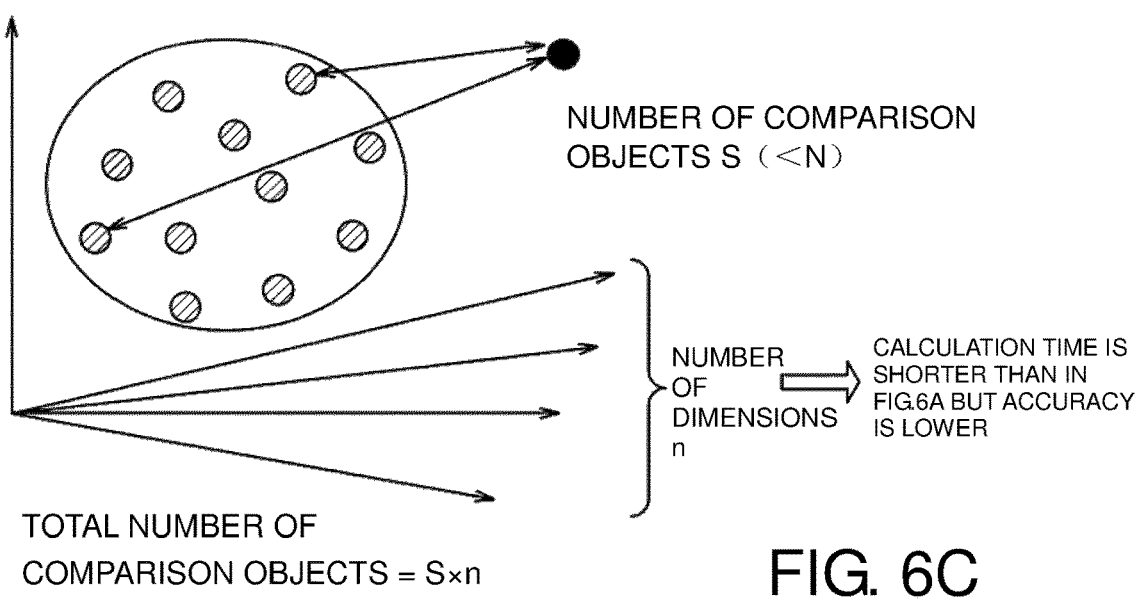

In the control system 1, a deviation acquisition time varies depending on the value of the first parameter and the value of the second parameter. FIG. 6A to 6C are diagrams schematically illustrating changes of the deviation acquisition time in the control system 1 according to the embodiments thereof.

In the example illustrated in FIG. 6A, the number of dimensions as the value of the first parameter is set to n, and the k value as the value of the second parameter is set to N. In this case, the number of pieces of data which are compared with the diagnosis object data is conceptually a product of the number of comparison objects N and the number of dimensions n (e.g., N*n).

In the example illustrated in FIG. 6B, the number of dimensions as the value of the first parameter is set to s (where s is a value less than n), and the k value as the value of the second parameter is set to N. In this case, the number of pieces of data which are compared with the diagnosis object data is conceptually a product of the number of comparison objects N and the number of dimensions s (e.g., N*s). With respect to the number of dimensions, since s is less than n, the total number of comparison objects in the example illustrated in FIG. 6B is less than the total number of comparison objects in the example illustrated in FIG. 6A, the calculation time (e.g., the deviation acquisition time) for calculating the degree of deviation (in the example of FIG. 6B) is shortened accordingly, but the abnormality detection accuracy thereof is decreased on the other hand.

In this way, a user can decrease or increase the deviation calculation time by a trade-off with the abnormality detection accuracy by changing the value of the first parameter. That is, the first parameter is a parameter that can shorten the deviation acquisition time.

In the example illustrated in FIG. 6C, the number of dimensions as the value of the first parameter is set to n, and the k value as the value of the second parameter is set to S (where S is a value less than N). In this case, the total number of comparison objects is conceptually a product of the number of comparison objects S and the number of dimensions n (e.g., S*n). Since S in the k value is less than N, the total number of comparison objects in the example illustrated in FIG. 6C is less than the total number of comparison objects in the example illustrated in FIG. 6A. Accordingly, the deviation calculation time decreases by as much, and the abnormality detection accuracy decreases.

When the k value is set by the second parameter, the learning data which is used to calculate the degree of deviation is selected in a descending order of reliabilities from the learning data stored in the table illustrated in FIG. 5A. In this way, a user can decrease or increase the deviation calculation time by a trade-off with the abnormality detection accuracy by changing the value of the second parameter. That is, the second parameter is a parameter that can shorten the deviation acquisition time. In addition, when the k value is set by the second parameter, the learning data which is used to calculate the degree of deviation may be randomly selected.

D. Main Processes of Detecting an Abnormality which is Performed by Control System 1

Figure 7:
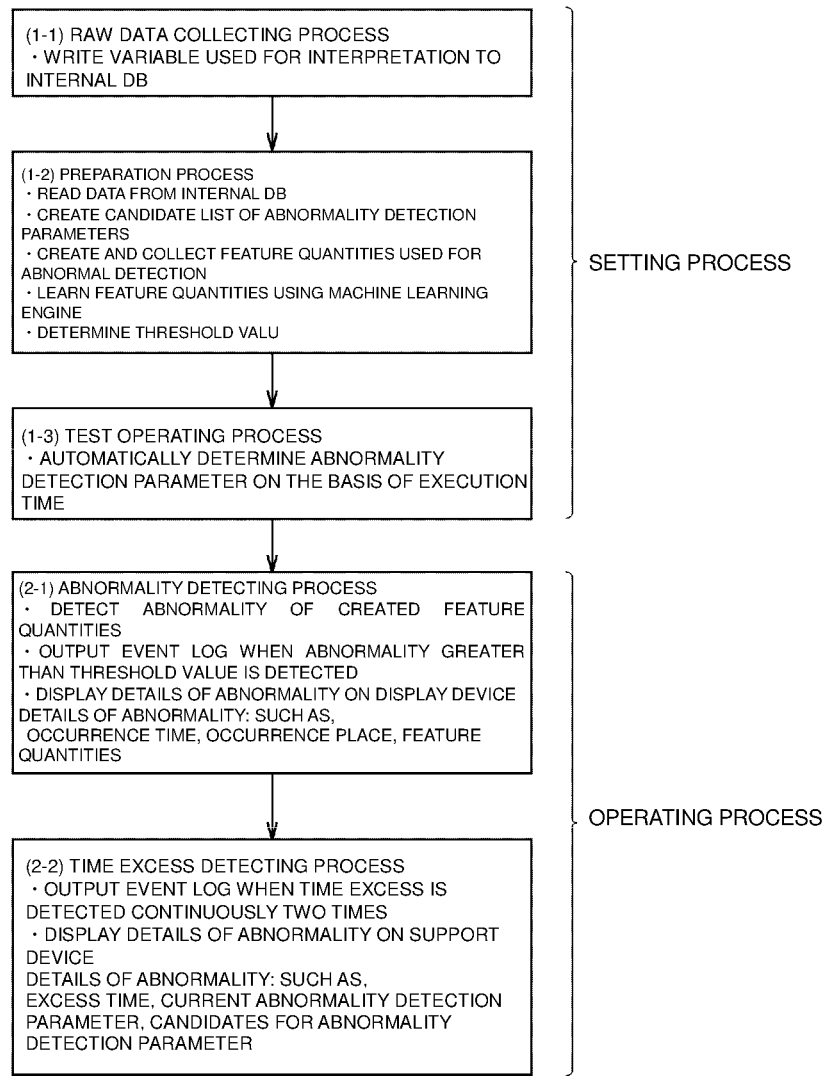
FIG. 7 is a diagram schematically illustrating main processes of detecting an abnormality which are performed by the control system according to the embodiment.

Main processes of detecting an abnormality which is performed by the control system 1 according to the embodiment will be described below. FIG. 7 is a diagram schematically illustrating the main processes of detecting an abnormality which is performed by the control system 1 according to the embodiment. Referring to FIG. 7, the abnormality detecting process includes a setting process and an operating process.

<d1. Setting Process>

The setting process includes a (1-1) raw data collecting process, a (1-2) preparation process, and a (1-3) test operating process.

In the (1-1) raw data collecting process, raw data which is used for interpretation associated with the abnormality detection among the data which is handled by the control device 100 is written to the internal DB 130. The raw data collecting process is implemented by executing an internal DB writing program of the control device 100 which will be described later.

In the control device 100, unique variable names are allocated to data (input data and output data) which are transmitted and received to and from the field and internal data, and a user program and the like are described by using the variable names. That is, in the control device 100, an environment in which variables are programmable is provided. Accordingly, in the following description, it is assumed that expression "specified variable" be used with substantially the same meaning as data is specified as a target. The scope of the disclosure is not limited to the configuration in which variables are programmable, but the technical scope of the disclosure may include a configuration in which an address in a memory is directly designated.

In this way, in the raw data collecting process, raw data acquired from a control object is collected.

Then, the (1-2) preparation process is performed. In the preparation process, raw data written to the internal DB 130 is read. A candidate list of abnormal detection parameters is created. The abnormality detection parameters include the first parameter and the second parameter. The abnormality detection parameters include a third parameter associated with an execution cycle of a (2-1) abnormality detecting process which will be described later. The third parameter is a parameter for setting an execution cycle of the abnormality detection process (hereinafter also referred to as a "diagnosis cycle"). A user can set the value of the third parameter by using the support device 200. This process is typically implemented by a data mining function of the data mining tool 226 of the support device 200 which will be described later.

Then, feature quantities are sequentially created from the read raw data. This process is implemented by executing a feature quantity creating program of the control device 100.

Then, machine learning is performed on the created feature quantities and the learning results are written to the internal DB 125. This process is provided by the machine learning engine 140 of the control device 100 which will be described later.

Then, a threshold value which is used to detect an abnormality is determined on the basis of the results of the machine learning. This process is implemented by executing the parameter setting tool 224 of the support device 200.

In this way, in the preparation process, the candidate list of the abnormality detection parameters which are used to detect an abnormality, the learning results of the machine learning, and the threshold value which is used to detect an abnormality are acquired.

Then, the (1-3) test operating process is performed. In the test operating process, on the basis of sets of parameters (for example, a set of the first parameter, the second parameter, and the third parameter) listed in the candidate list of the abnormality detection parameters, sets of parameters are used one by one for executing the machine learning engine 140.

An execution time of the machine learning engine 140 (a deviation acquisition time) is measured whenever the machine learning engine 140 is executed. When all the abnormality detection parameters are used, one abnormality detection parameter is automatically determined among the abnormality detection parameters included in the candidate list on the basis of the total execution time of the machine learning engine 140.

In this way, in the test operating process, the abnormality detection parameter which is used to detect an abnormality is determined.

<d2: Operating Process>

The operating process includes a (2-1) abnormality detecting process and a (2-2) time excess detecting process.

In the (2-1) abnormality detecting process, a degree of deviation between data of the created feature quantities (diagnosis object data) and data of the group of feature quantities (learning data) written as the learning result to the internal DB 125 is acquired. An abnormality occurring in the control object is detected on the basis of the acquired degree of deviation and the threshold value. When an abnormality is detected, an event log indicating that the abnormality is detected is outputted.

When an event log is output in the abnormality detecting process, details of the abnormality are displayed on the display device 400. The detailed details of the abnormality include an abnormality occurrence time, an abnormality occurrence location, and feature quantities in which the abnormality is detected.

In this way, in the abnormality detecting process, an abnormality occurring in the control target is detected and a message indicating the detection of an abnormality is outputted by the display device 400.

Then, the (2-2) time excess detecting process is preformed. In the time excess detecting process, when the deviation acquisition time in the machine learning engine 140 in the abnormality detecting process exceeds the time of the execution cycle (the diagnosis cycle) of the abnormality detecting process continuously two times, an event log indicating that the deviation acquisition time exceeds the time of the execution cycle continuously two times is outputted. The event log may be output when the deviation acquisition time in the machine learning engine 140 exceeds the time of the diagnosis cycle one time or more.

When the event log is outputted in the time excess detecting process, abnormality details (contents) are displayed on the display unit 218 of the support device 200. The abnormality details include the excess time, the current abnormality detection parameter causing the time excess, the candidates for the abnormality detection parameter created in the preparation process, and the like.

In this way, in the time excess detecting process, excess of the deviation acquisition time in the machine learning engine 140 is detected and a message indicating the foregoing purport is outputted by the support device 200.

E. Main Functions of Control System 1

Main functions of the control system 1 according to the embodiment will be described below.

Figure 8:
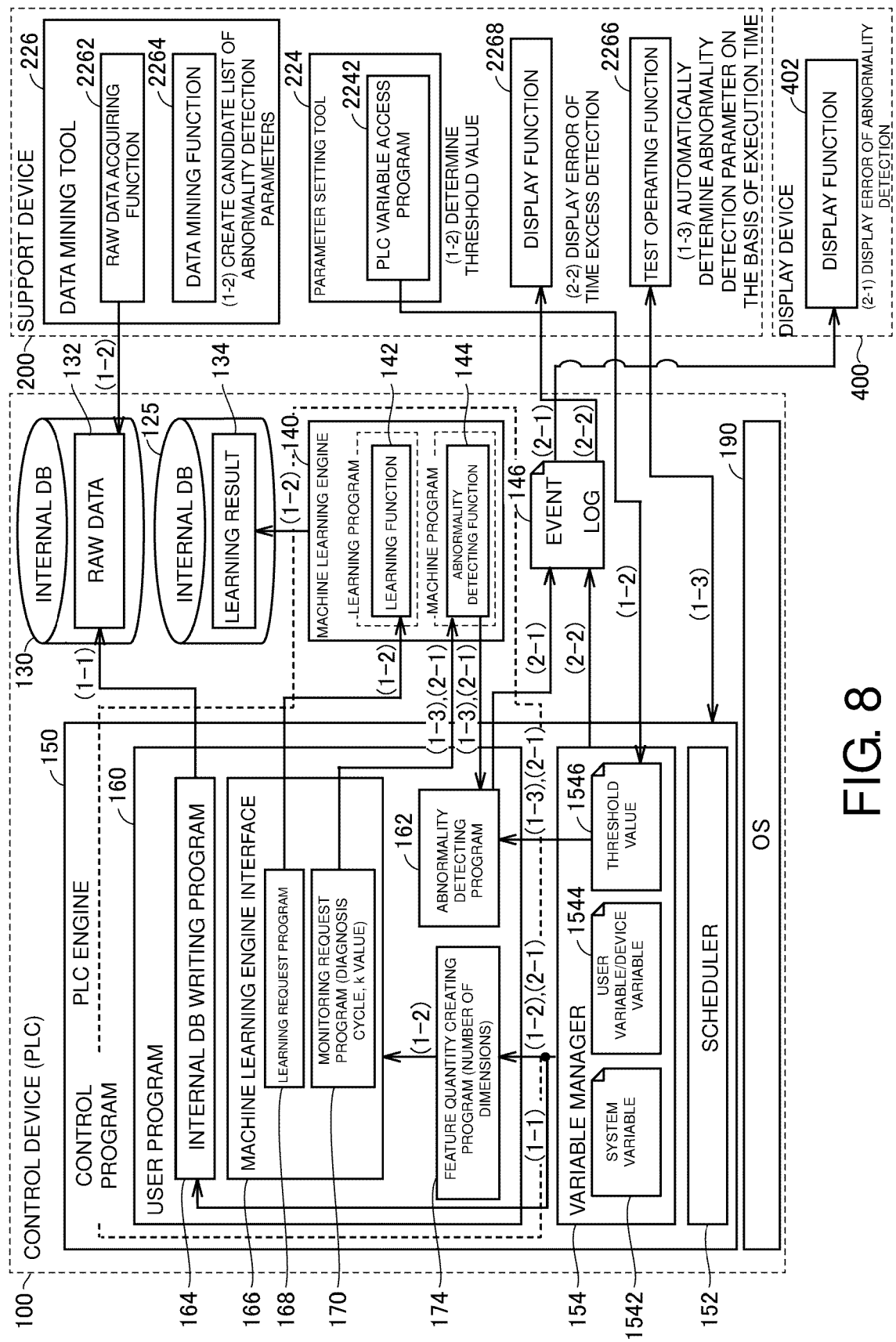
FIG. 8 is a diagram schematically illustrating functions which are provided by devices in the control system according to the embodiment.

FIG. 8 is a diagram schematically illustrating functions of devices of the control system 1 according to the embodiment. In the schematic diagram illustrated in FIG. 8, numerals in parentheses correspond to processing details of the processes (1-1) to (1-3) and (2-1) to (2-2) illustrated in FIG. 7.

The control device 100 includes a PLC engine 150 in addition to the internal DB 125, the internal DB 130, and the machine learning engine 140. These functions are basically implemented by causing the processor 102 (FIG. 2) of the control device 100 to execute a program (or programs). In order to provide an environment in which the process 102 can execute the program, an OS 190 is also installed in the control device 100.

The PLC engine 150 is typically provided by executing a system program which is not illustrated and a user program 160 on the OS 190. That is, according to an embodiment of the disclosure, the PLC engine 150 is embodied by a kind of computer.

More specifically, the PLC engine 150 includes a scheduler 152, a variable manager 154, and a user program 160.

The scheduler 152 controls execution timings, an execution orders, or the like of programs (or tasks corresponding thereto) constituting the PLC engine 150. An execution cycle is determined in advance for each task included in the PLC engine 150, and the scheduler 152 performs control such that the task can be repeatedly executed at the determined execution cycle.

The variable manager 154 manages data which is updated by the I/O refreshing process which is periodically performed by the PLC engine 150 as a variable. More specifically, the variable manager 154 stores and manages: a system variable 1542 including data groups indicating operating states of the units of the control device 100, a user variable/device variable 1544 including data groups which are written and read by a user program which is executed by the PLC engine 150, and a threshold value 1546 which is used to detect an abnormality.

The threshold value 1546 can be accessed and updated by a PLC variable access program 2242 of the support device 200. That is, the variable manager 154 provides a function of storing the threshold value 1546 and updating the stored threshold value 1546 in response to a request from an external device.

The user program 160 can be arbitrarily created by a user, and typically includes an internal DB writing program 164, a machine learning engine interface 166, a feature quantity creating program 174, and an abnormality detecting program 162. Commands of programs constituting the user program 160 may be described as a unified program or may be described separately as a plurality of programs.

The internal DB writing program 164 writes a predetermined variable among variables included in the user variable/device variable 1544 to the internal DB 130.

The machine learning engine interface 166 includes commands for operating the machine learning engine 140. Specifically, the machine learning engine interface 166 includes a learning request program 168 and a monitoring request program 170.

That is, the machine learning engine interface 166 includes commands for instructing the machine learning engine 140 to perform machine learning. The machine learning engine interface 166 includes commands using the threshold value 1546 for monitoring a feature quantity and instructing abnormality detection.

The feature quantity creating program 174 includes commands for creating a feature quantity on the basis of the first parameter. That is, the feature quantity creating program 174 creates a feature quantity from raw data acquired from a control object on the basis of the first parameter.

Typically, the raw data 132 which is collected in the (1-1) raw data collecting process is stored in the internal DB 130.

The machine learning engine 140 is typically provided by executing a learning program and a machine program over the OS 190. That is, according to an embodiment of the disclosure, the machine learning engine 140 is embodied by a type of computer.

The learning program and the machine program along with the user program in the PLC engine are also referred to as a control program. Programs included in the control program are all created by a user.

The machine learning engine 140 has a learning function 142 for performing processing required for the (1-2) preparation process and an abnormality detecting function 144 for performing processing necessary for the (1-3) test operating process and the (2-1) abnormality detecting process.

The learning function 142 is implemented by executing a learning program. The learning function 142 performs machine learning by using the feature quantity which is created by executing the feature quantity creating program 174. A learning result 134 of the machine learning is stored in the internal DB 125.

The abnormality detecting function 144 is implemented by executing a machine program. The abnormality detecting function 144 acquires a degree of deviation between data of the created feature quantity (diagnosis object data) and data of the group of feature quantities (learning data) written as the learning result to the internal DB 125. The abnormality detecting function 144 is performed in response to a monitoring request trigger by the monitoring request program 170. In other words, the monitoring request program 170 instructs the abnormality detecting function 144 to starts its execution.

The abnormality detecting program 162 detects an abnormality occurring in a control object on the basis of the degree of deviation acquired by the abnormality detecting function 144 and the threshold value 1546. When an abnormality is detected, the abnormality detecting program 162 outputs an event log 146 indicating details of the detected abnormality.

In addition to the development program 222 (FIG. 3), the parameter setting tool 224 and the data mining tool 226 are installed in the support device 200.

The parameter setting tool 224 includes a PLC variable access program 2242 for accessing variables which are managed by the variable manager 154 of the control device 100. The PLC variable access program 2242 enables reference to and rewriting of variables in the control device 100. A user can determine the threshold value in the (1-2) preparation process by executing the parameter setting tool 224.

The data mining tool 226 includes a raw data acquiring function 2262 and a data mining function 2264. In the (1-1) raw data collecting process, the raw data acquiring function 2262 accesses the internal DB 130 and extracts necessary data from the raw data collected in the internal DB 130. The data mining function 2264 mainly creates a candidate list of abnormality detection parameters in the (1-2) preparation process.

The support device 200 includes a test operating function 2266 and a display function 2268. The test operating function 2266 executes the machine learning engine 140 in the (1-3) test operating process. The execution time of the machine learning engine 140 (the deviation acquisition time) is stored as a system variable 1542 by the variable manager 154. The test operating function 2266 determines one abnormality detection parameter among one or more abnormality detection parameters included in the candidate list on the basis of the total execution time of the machine learning engine 140 which is acquired from the variable manager 154.

The display function 2268 outputs a message indicating that the deviation acquisition time of the machine learning engine 140 is exceeded to the display unit 218 on the basis of the event log 146 outputted in the (2-2) time excess detecting process.

Specifically, the deviation acquisition time of the machine learning engine 140 is stored as the system variable 1542 by the variable manager 154. On the other hand, an execution cycle of the abnormality detecting process (a diagnosis cycle) is stored as the system variable 1542 by the variable manager 154. When the deviation acquisition time of the machine learning engine 140 in the abnormal detecting process exceeds the time of the execution cycle of the abnormality detecting process (the diagnosis cycle) continuously two times, an event log indicating that foregoing excess is outputted from the variable manager 154. The display function 2268 outputs a message indicating that the deviation acquisition time of the machine learning engine 140 is exceeded to the display unit 218 on the basis of the event log 146.

The display function 2268 may output the candidate list of abnormality detection parameters created in the (1-2) preparation process, the determined threshold value, and the like to the display unit 218.

The display device 400 includes a display function 402. The display function 402 displays a message indicating that an abnormality occurs in the control object on the basis of the event log 146 output in the (2-1) abnormality detecting process.

F. Details of Main Processes in Setting Process

Figure 9:
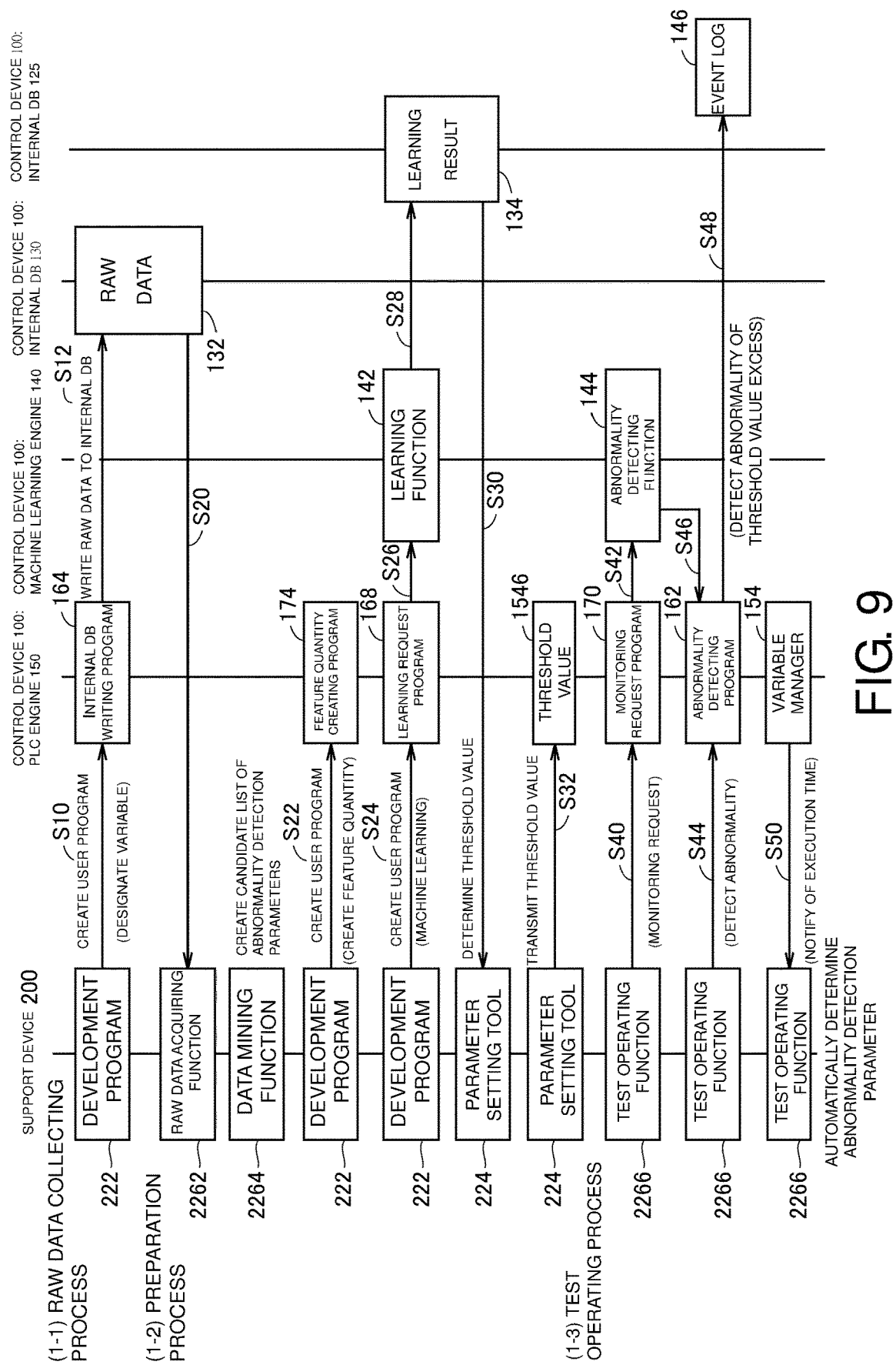
FIG. 9 is a diagram schematically illustrating main processing details in a setting process of the control system according to the embodiment.

FIG. 9 is a diagram schematically illustrating details of main processes in the setting process of the control system 1 according to the embodiment. Hereinafter, a step is simply abbreviated to "S."

Referring to FIG. 9, in the (1-1) raw data collecting process, a user operates the development program 222 of the support device 200 and creates a user program for designating variables which should be collected in the internal DB 130 (S10). The created user program corresponds to the internal DB writing program 164. By causing the PLC engine 150 of the control device 100 to execute the internal DB writing program 164, the raw data 132 is written to the internal DB 130 of the control device 100 (S12).

In the (1-2) preparation process, a user operates the data mining tool 226 of the support device 200 to read and collect the raw data 132 collected in the internal DB 130 (S20). When the raw data is collected, a candidate list of abnormality detection parameters is created by the data mining function 2264.

A user operates the development program 222 of the support device 200 to create a user program associated with creation of a feature quantity on the basis of one abnormality detection parameter in the candidate list of abnormality detection parameters determined in a (2) data mining process (S22). The created user program corresponds to the feature quantity creating program 174.

A user operates the development program 222 of the support device 200 to create a user program for designating machine learning using a feature quantity (S24). The created user program corresponds to the learning request program 168.

By causing the machine learning engine interface 166 of the PLC engine 150 of the control device 100 to execute the learning request program 168 (S26), the learning function 142 of the machine learning engine 140 of the control device 100 performs machine learning and stores the learning result 134 thereof in the internal DB 125 (S28). In addition, the feature quantity creating program 174 and the learning request program 168 may be simultaneously executed.

Then, the user operates the parameter setting tool 224 of the support device 200 and reads and interprets the learning result 134 stored in the internal DB 125 to determine the threshold value (S30). Subsequently, the user operates the parameter setting tool 224 of the support device 200 to transmit the determined threshold value 1546 to the PLC engine 150 of the control device 100 (S32).

In the (1-3) test operating process, when the user performs the test operating function by using the support device 200 (S40), the monitoring request program 170 of the PLC engine 150 is executed.

When an execution start is instructed to the abnormality detecting function 144 of the machine learning engine 140 by executing the monitoring request program 170 (S42), the abnormality detecting function 144 acquires the degree of deviation between data of the created feature quantity (the diagnosis object data) and data of the group of feature quantities (the learning data) written as the learning result to the internal DB 125.

Then, in the test operating function 2266, the abnormality detecting program 162 of the PLC engine 150 is executed (S44). When the abnormality detecting program 162 is executed, an abnormality occurring in the control object is detected on the basis of the degree of deviation acquired by the abnormality detecting function 144 and the threshold value 1546 (S46). When an abnormality occurring in the control object is detected, an event log 146 indicating that detection of an abnormality is output (S48).

Then, in the test operating function 2266, the execution time of the machine learning engine 140 (the deviation acquisition time of the abnormality detecting function 144) is acquired from the variable manager 154 by the support device 200 (S50). In the test operating function 2266, one abnormality detection parameter among one or more abnormality detection parameters included in the candidate list is determined on the basis of the total execution time of the machine learning engine 140 acquired from the variable manager 154.

The above-mentioned elements of the control device 100 and the support device 200 cooperate to perform the setting process according to the embodiment.

G. Details of Main Processing in Operating Process

Figure 10:
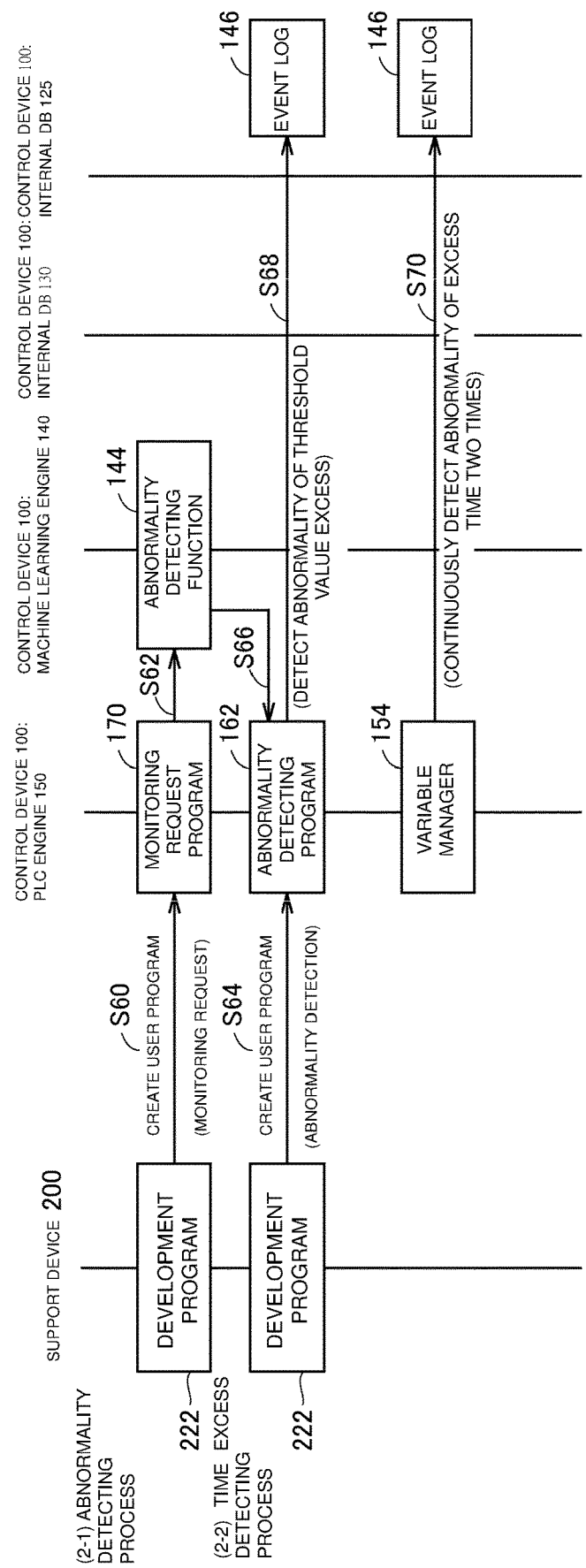
FIG. 10 is a diagram schematically illustrating main processing details in an operating process of the control system according to the embodiment.

FIG. 10 is a diagram schematically illustrating details of main processing in the operating process of the control system 1 according to the embodiment.

Referring to FIG. 10, in the (2-1) abnormality detecting process, a user operates the development program 222 of the support device 200 to create a user program for instructing the abnormality detecting function 144 of the machine learning engine 140 to start its execution (S60). The created user program corresponds to the monitoring request program 170.

When the abnormality detecting function 144 is instructed to start its execution by executing the monitoring request program 170 (S62), the abnormality detecting function 144 acquires the degree of deviation between the data of the created feature quantity (the diagnosis object data) and the data of the group of feature quantities (the learning data) written as the learning result to the internal DB 125.

The user operates the development program 222 of the support device 200 to create a user program for detecting an abnormality occurring in the control object (S64). The created user program corresponds to the abnormality detecting program 162.

When the abnormality detecting program 162 is executed, an abnormality occurring in the control object is detected on the basis of the degree of deviation acquired by the abnormality detecting function 144 and the threshold value 1546 (S66). When an abnormality occurring in the control object is detected, an event log 146 indicating detection of an abnormality is outputted (S68).

In the (2-2) time excess detecting process, when the deviation acquisition time of the machine learning engine 140 in the abnormality detecting process exceeds the time of the execution cycle of the abnormality detecting process (the diagnosis cycle) continuously two times, an event log indicating the excess of time is outputted from the variable manager 154 (S70).

H. Execution Cycles of User Program and Machine Program

Figure 11:
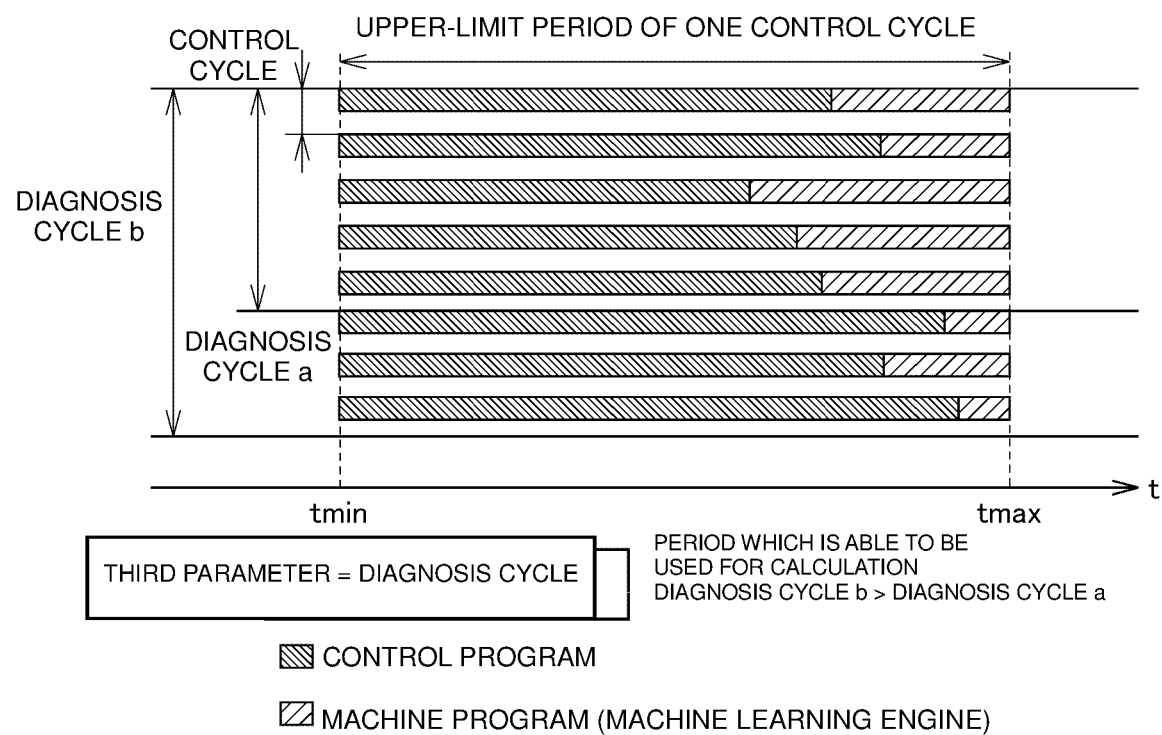
FIG. 11 is a diagram schematically illustrating execution cycles of a user program and a machine program which are executed by the control system according to the embodiment.
Figure 12:
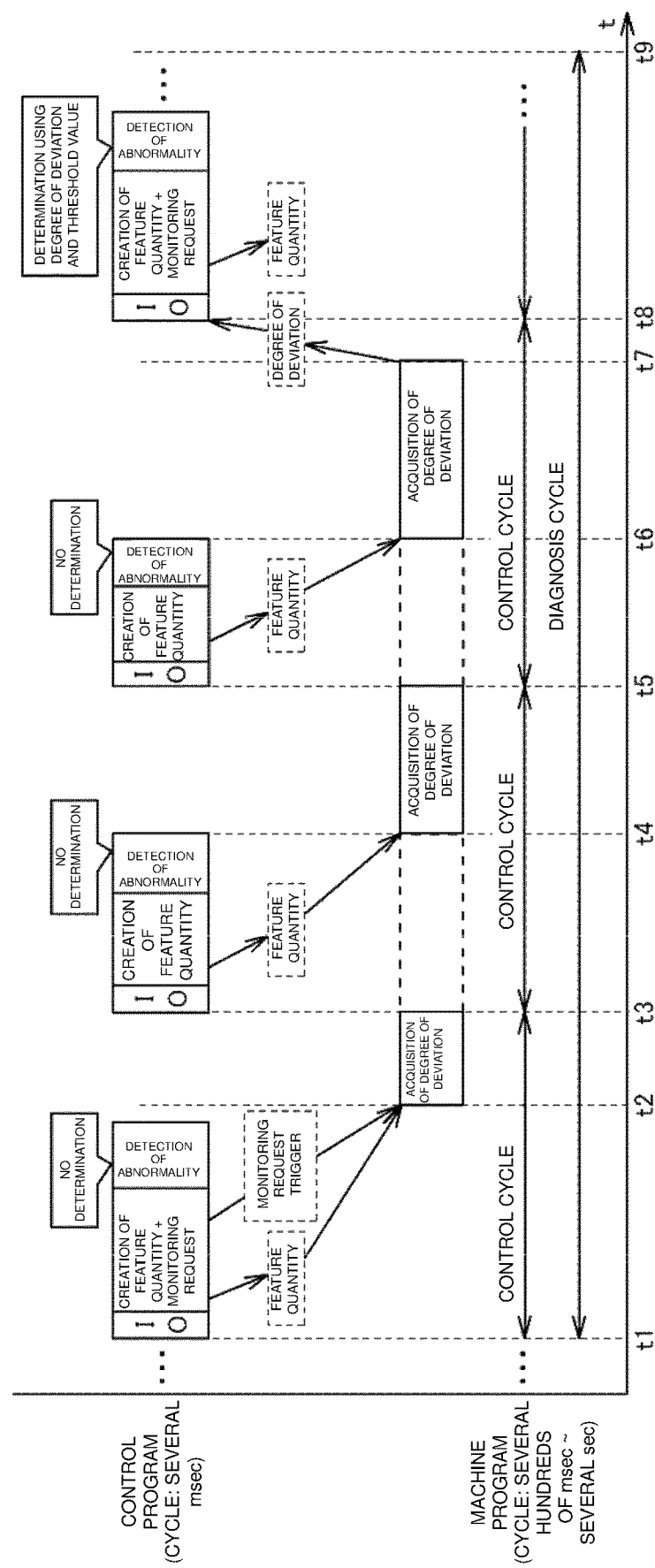
FIG. 12 is a diagram schematically illustrating an execution example of a user program and a machine program which are executed by the control system according to the embodiment.

FIG. 11 is a diagram schematically illustrating execution cycles of a user program and a machine program which are executed by the control system 1 according to the embodiment. FIG. 12 is a diagram schematically illustrating an example in which a user program and a machine program are executed in the control system 1 according to the embodiment. In FIGS. 11 and 12, examples of execution of a user program and a machine program in the operating process are illustrated.

Referring to FIG. 11, a user program in the PLC engine 150 is executed at a predetermined cycle (hereinafter also referred to as a control cycle). The user program is executed with a priority to the machine program. An upper-limit time of one control cycle (the time from time train to time tmax in the drawing) is determined in advance and, when execution of the user program is completed within the upper-limit time of one control cycle, a remaining time of that control cycle is used to execute the machine program.

Referring to FIG. 12, for example, the user program is executed at a control cycle of several msec and the machine program is executed at a cycle from several hundreds of msec to several sec. In the user program which is executed at time t1, a feature quantity is created by the feature quantity creating program after an input/output process has been performed. The created feature quantity is output to the machine learning engine 140. A monitoring request trigger is outputted by the monitoring request program.

When a series of processes of the user program are completed at time t2, the machine program is executed in response to the monitoring request trigger using an empty time (available time) of current control cycle (the remaining period of the current control cycle) until a next control cycle starts.

During execution of the machine program, the degree of deviation between the data of the feature quantity (the diagnosis object data) created by executing the user program and the data of the group of feature quantities (the learning data) written as the learning result to the internal DB 125 is calculated.

When one control cycle of the user program ends at time t3, a next control cycle starts and the user program is executed again. In the control cycle, since the degree of deviation for the diagnosis object data is not yet acquired by the machine learning engine 140, a monitoring request trigger is not outputted by the monitoring request program. A feature quantity is created by the feature quantity creating program, but the machine learning engine 140 has not acquired the degree of deviation for the diagnosis object data yet and thus does not calculate the degree of deviation using the newly acquired feature quantity.

When a series of processes of the user program are completed at time t4, the degree of deviation is calculated again using an empty time (e.g., from time t4 to time t5) until the next control cycle starts. In this way, after the processing of the user program is completed, the machine learning engine 140 (continuously) calculates the degree of deviation using an empty time within one control cycle.

When acquisition of the degree of deviation is completed by the machine learning engine 140 in a period from time t6 to time t7, the degree of deviation (for example, a Mahalanobis distance) is inputted to the PLC engine 150 by the user program in the next control cycle which is performed at time t8.

The user program executed at time t8 detects an abnormality occurring in a control object on the basis of the input degree of deviation and the predetermined threshold value.

The above-mentioned acquisition of the degree of deviation by executing the machine program may be performed within an execution cycle of the abnormality detecting process (the diagnosis cycle) set by the third parameter.

Referring back to FIG. 11, it is assumed that a diagnosis cycle a is set by the third parameter. In the diagnosis cycle a, the acquisition of the degree of deviation by executing the machine program is not completed. In this case, even when the user program is executed in the next control cycle, the acquisition of the degree of deviation is continuously performed using an empty time in the control cycle. When such excess of time occurs continuously two times (after passing the diagnosis cycle, acquisition of the degree of deviation is continuously performed continuously two times), an event log is output in the above-mentioned time excess detecting process.

As described above, a user can set the execution cycle of the abnormality detecting process (the diagnosis cycle) as the third parameter. Accordingly, for example, as illustrated in FIG. 11, when the user sets the third parameter to a diagnosis cycle b which is longer than the diagnosis cycle a, the acquisition of the degree of deviation is completed in the diagnosis cycle.

In this way, by changing the value of the third parameter, the user can adjust the time which can be used to acquire the degree of deviation. The deviation acquisition time of the machine learning engine 140 depends on a production system in which a control object is placed, such as the number of workpieces flowing in a production line per unit time. Accordingly, the user sets a desired diagnosis cycle by setting the third parameter.

Not limited to the method of changing the diagnosis cycle by setting the third parameter as described above, the user may adjust the deviation acquisition time by setting the first parameter and the second parameter.

Specifically, the first parameter is a parameter for setting types of elements (such as an average value, a standard deviation, a degree of skewness, a degree of kurtosis, a maximum value, and a minimum value) defining a feature quantity and the number of elements (the number of dimensions of a feature vector). Accordingly, since the first parameter is associated with a feature quantity creation time for each control cycle, a series of processing time of the user program is shortened by setting the first parameter. That is, it is possible to secure an empty time in one control cycle, which is used to calculate the degree of deviation, as much as possible. The first parameter has an influence on the deviation calculation time. Accordingly, a user can shorten the deviation acquisition time by setting the first parameter.

The second parameter is a parameter for setting the k value. Accordingly, the second parameter has an influence on the deviation calculation time. Accordingly, the user can shorten the deviation acquisition time by setting the second parameter.

In this way, by setting the third parameter in consideration of the deviation acquisition time which varies depending on a production system in which a control object is placed, the user can adjust the diagnosis cycle. Even when a diagnosis cycle is determined, the user can set the deviation acquisition time to be included in the diagnosis cycle by setting the first parameter and the second parameter. Accordingly, the user does not need to modify the user program itself, but can adjust the deviation acquisition time to be included in the diagnosis cycle by only setting the parameters. As a result, it is possible to minimize an increase in the number of maintenance processes of the production system.

I. User Program

Figure 13:
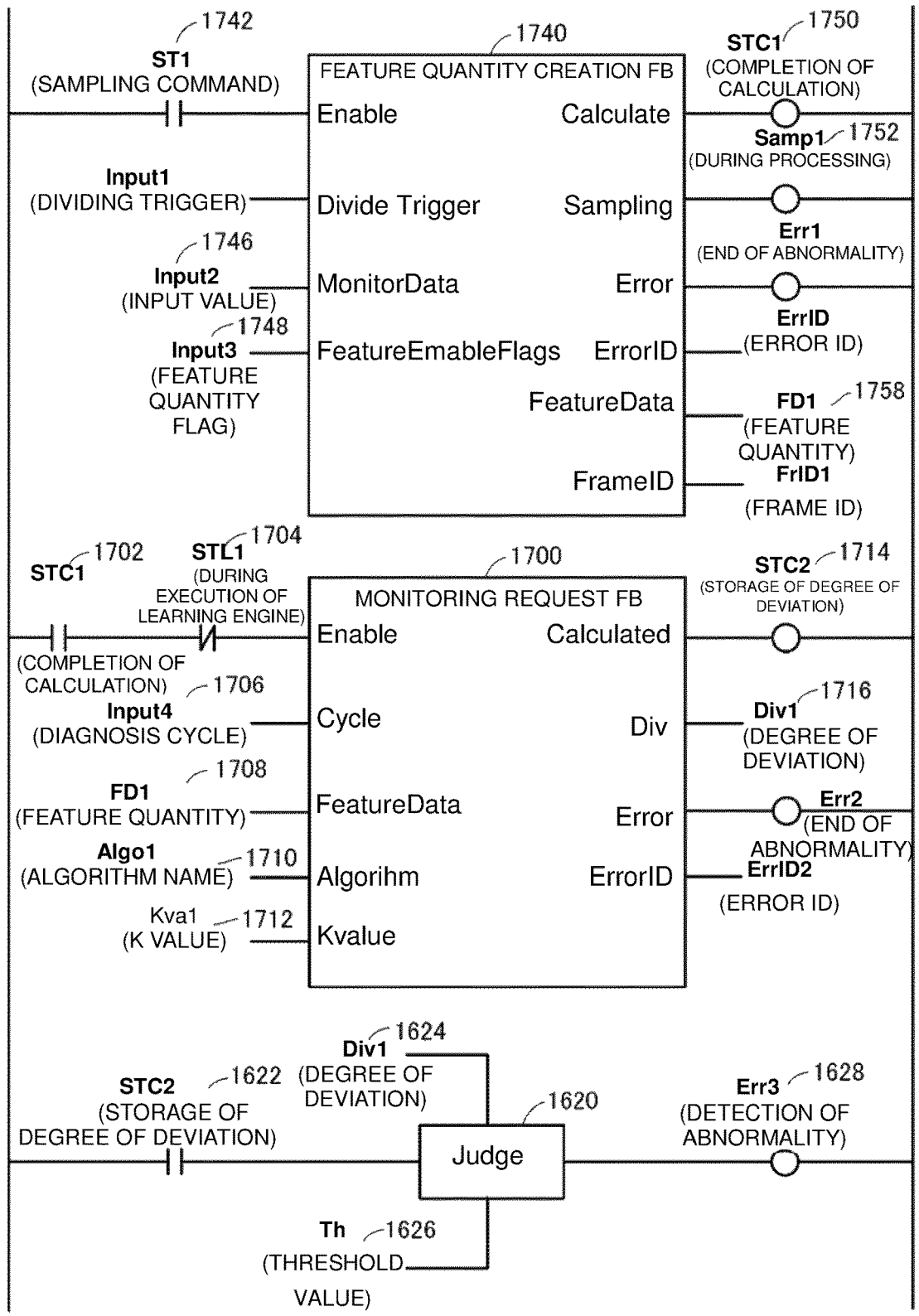
FIG. 13 is a diagram illustrating an example of a user program which is executed by the control system according to the embodiment.

A user program will be described below. FIG. 13 is a diagram illustrating an example of a user program which is executed by the control system 1 according to the embodiment. As described above, the user program includes a feature quantity creating program, a monitoring request program, and an abnormality detecting program.

Referring to FIG. 13, the feature quantity creating program may be typically described using a feature quantity creating function block 1740.

As for the feature quantity creating function block 1740, designation of variables associated with creation of a feature quantity is defined. For example, ST1 indicated by reference sign 1742 designates whether to execute the feature quantity creating program. Input2 indicated by reference sign 1746 designates input of raw data acquired from a control object.

Input3 indicated by reference sign 1748 designates an element defining a feature quantity by bits. A user can set the types of the elements (such as an average value, a standard deviation, a degree of skewness, a degree of kurtosis, a maximum value, and a minimum value) defining a feature quantity and the number of elements (the number of dimensions of a feature vector) by designating Input3 indicated by reference sign 1748. That is, the designation in Input3 indicated by reference sign 1748 corresponds to setting of the first parameter.

STC1 indicated by reference sign 1750 designates completion of calculation of a feature quantity. Samp1 indicated by reference sign 1752 designates during calculation of a feature quantity. FD1 indicated by reference sign 1758 designates a calculated feature quantity.

The monitoring request program may be typically described using a monitoring request function block 1700.

As for the monitoring request function block 1700, designations of variables associated with indication of start of execution of a machine program are defined. For example, STC1 indicated by reference sign 1702 is associated with STC1 indicated by reference sign 1750 and designates completion of calculation of a feature quantity. STL1 indicated by reference sign 1704 designates whether a machine program is executed by the machine learning engine 140.

Input4 indicated by reference sign 1706 designates a diagnosis cycle. A user can set the diagnosis cycle by designating Input4 indicated by reference sign 1706. That is, designation in Input4 indicated by reference sign 1706 corresponds to setting of the third parameter.

FD1 indicated by reference sign 1708 is associated with FD1 indicated by reference sign 1758 and designates a calculated feature quantity. Algo1 indicated by reference sign 1710 designates an algorithm name.

Kva1 indicated by reference sign 1712 designates a k value. A user can set the k value by designating Kva1 indicated by reference sign 1712. That is, designation in Kva1 indicated by reference sign 1712 corresponds to setting of the second parameter.

STC2 indicated by reference sign 1714 designates completion of storage of a degree of deviation. Div1 indicated by reference sign 1716 designates the stored degree of deviation.

In the abnormality detecting program, designations of variables associated with abnormality detection are defined. For example, STC2 indicated by reference sign 1622 is associated with STC2 indicated by reference sign 1714 and designates completion of storage of a degree of deviation. Div1 indicated by reference sign 1624 is associated with Div1 indicated by reference sign 1716 and designates the stored degree of deviation. Th indicated by reference sign 1626 designates a threshold value which is used for abnormality detection.

Err3 indicated by reference sign 1628 designates determination results of the degree of deviation and the threshold value in Judge indicated by reference sign 1620.

The user program illustrated in FIG. 13 is an example and may employ any description method.

J. Specific Example

A specific example of abnormality detection using the control system 1 according to this embodiment will be described below.

Figure 14:
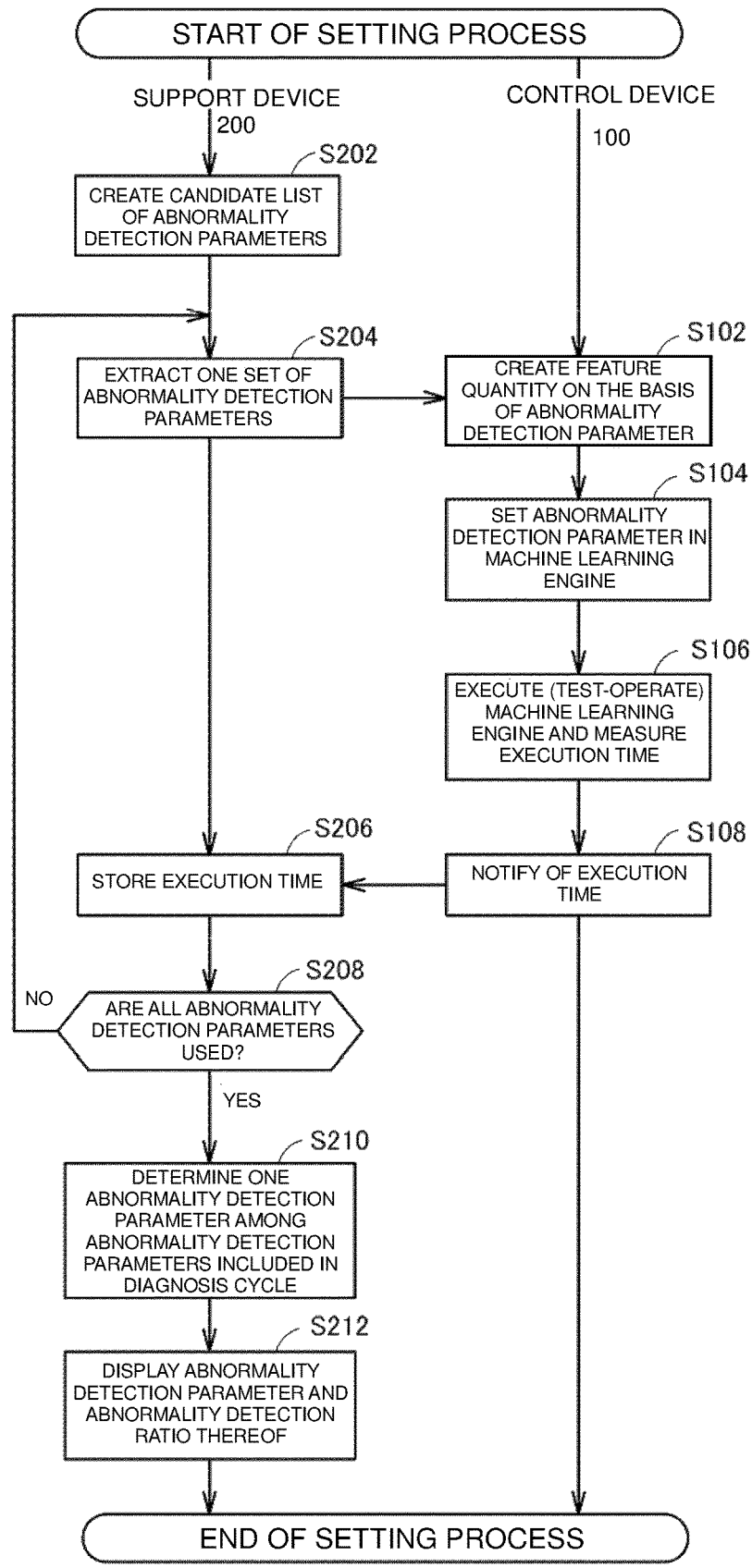
FIG. 14 is a flowchart illustrating a setting process which is performed by the control system according to the embodiment.

FIG. 14 is a flowchart illustrating a setting process which is performed by the control system 1 according to this embodiment.

Referring to FIG. 14, when the setting process is started, the support device 200 creates a candidate list of abnormality detection parameters (S202). The candidate list of abnormality detection parameters is created on the basis of past result data, simulation, or the like. For example, when a diagnosis cycle is set in advance as a value of the third parameter, the candidate list of abnormality detection parameters may be created on the basis of the set diagnosis cycle.

The support device 200 extracts one set of abnormality detection parameters among one or more sets of parameters (for example, a set of the first parameter, the second parameter, and the third parameter) included in the candidate list of abnormality detection parameters (S204).

On the other hand, the control device 100 creates a feature quantity on the basis of the abnormality detection parameters extracted by the support device 200 (S102). Specifically, the control device 100 creates a feature quantity on the basis of the types of the elements (such as an average value, a standard deviation, a degree of skewness, a degree of kurtosis, a maximum value, and a minimum value) and the number of elements (the number of dimensions of a feature vector) defined by the first parameter.

The control device 100 sets the abnormality detection parameters in the machine learning engine 140 (S104). The control device 100 executes the machine learning engine 140 and measures an execution time thereof (S106). Specifically, the control device 100 acquires a degree of deviation using the machine learning engine 140 on the basis of the k value which is defined by the second parameter. Then, the control device 100 measures the acquisition time thereof. Then, the control device 100 notifies the support device 200 of the measured execution time (S108).

On the other hand, the support device 200 stores the execution time notified from the control device 100 (S206). When all the abnormality detection parameters included in the candidate list are not used (NO in S208), the support device 200 extracts one set of abnormality detection parameters again (S204).

When all the abnormality detection parameters included in the candidate list are used (YES in S208), the support device 200 determines one abnormality detection parameters among the abnormality detection parameters for being within the diagnosis cycle set by the third parameter (S210).

For example, the support device 200 can employ an abnormality detection parameter in which the execution time is shorter or an abnormality detection parameter in which an abnormality detection ratio is higher. The support device 200 may determine the abnormality detection parameter by weighting the execution time and the abnormality detection ratio. Specifically, a weighting factor (of an abnormality detection parameter) is set to be greater as the execution time (of the abnormality detection parameter) becomes shorter, the weighting factor is set to be greater as the abnormality detection ratio becomes higher, and an abnormality detection parameter in which multiplication of the weighting factors thereof is the largest may be employed. The support device 200 may determine one abnormality detection parameter from a viewpoint other than the execution time and the abnormality detection ratio.

The support device 200 displays the determined abnormality detection parameter and the determined abnormality detection ratio on the display unit 218 (S212) and ends the setting process. Thereafter, the operating process is performed.

FIGS. 15A and 15B are diagrams illustrating an example of a candidate list which is created by the control system 1 according to this embodiment. The candidate list illustrated in FIG. 15A-15B is an example of the candidate list which is created in S202 of FIG. 14.

Referring to FIG. 15A, the support device 200 creates a candidate list storage table. A candidate list of abnormality detection parameters is stored in the candidate list storage table. For example, in the example illustrated in FIG. 15A, when 120 msec is set as the diagnosis cycle, Parameters 1 to 6 are included as candidates.

In the candidate list storage table, the diagnosis cycle corresponds to a set value of the third parameter, the k value corresponds to a set value of the second parameter, and the number of dimensions corresponds to a set value of the first parameter. Referring to FIG. 15B, the first parameter is set using flag Bits stored in a feature quantity calculation flag table.

In the setting process, the machine learning engine 140 acquires a degree of deviation using all the abnormality detection parameters included in the candidate list and measures the execution time thereof. In the example illustrated in FIG. 15A, when Parameters 3 to 6 are used, the execution time of the machine learning engine 140 is included in the diagnosis cycle of 120 msec. On the other hand, when Parameters 1 and 2 are used, the execution time thereof exceeds the diagnosis cycle.

Total Score is calculated on the basis of the execution time and the abnormality detection ratio among the abnormality detection parameters in which the execution time of the machine learning engine 140 is included in (within) the diagnosis cycle. One abnormality detection parameter is determined on the basis of the result thereof (One abnormality detection parameter is determined based on the calculated total scores). In this example, Parameter 3 is determined as the abnormality detection parameter (the total score of the Parameter 3 is the highest). Parameter 3 illustrated in FIG. 15A-15B is an example of the abnormality detection parameter which is determined in S210 of FIG. 14.

Figure 16:
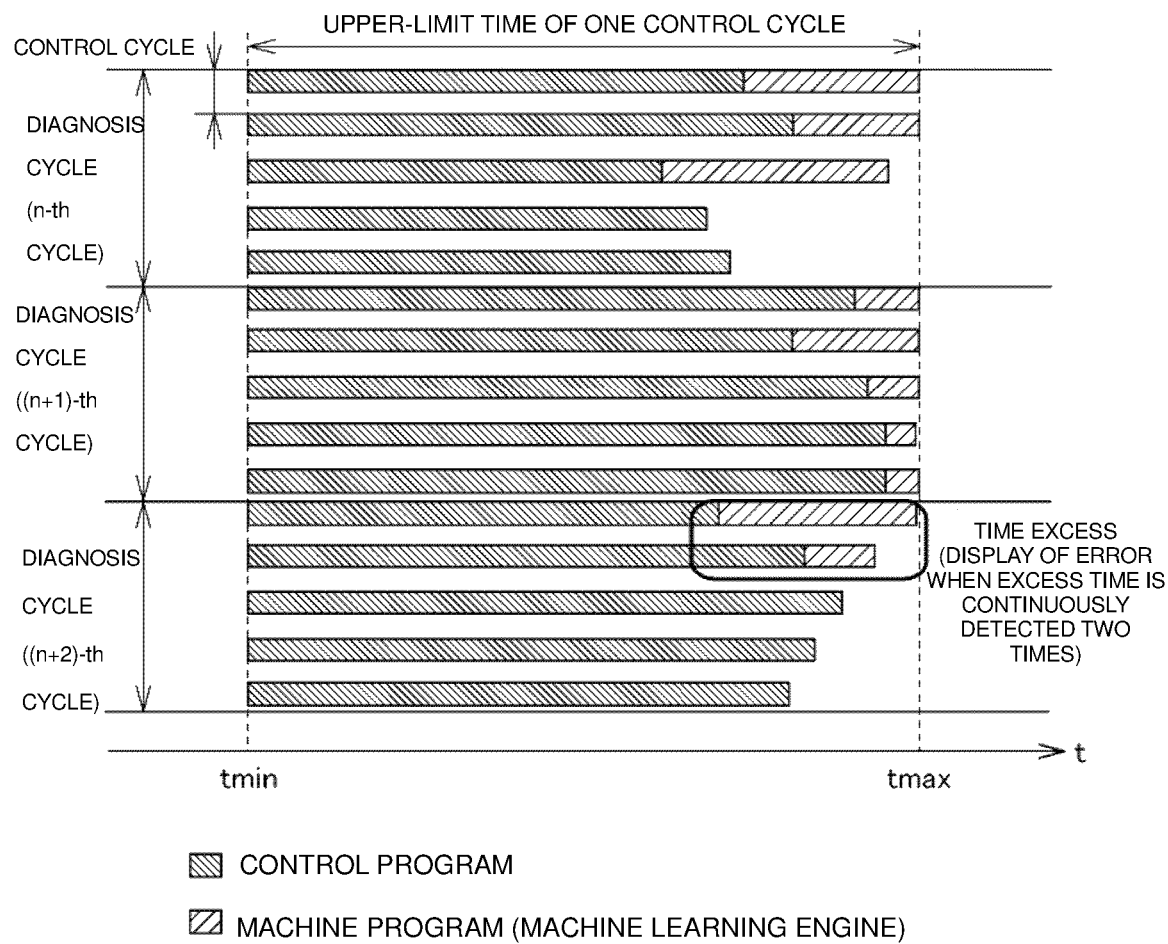
FIG. 16 is a diagram schematically illustrating an example in which diagnosis is not completed in a diagnosis cycle which is set in the control system according to the embodiment.

When Parameter 3 is determined as the abnormality detection parameter in the setting process, the operating process is performed using the parameter in a next step. Even when time excess does not occur in the setting process, there is a likelihood that time excess will occur by behavior of a control object in actual operation. FIG. 16 is a diagram schematically illustrating an example in which diagnosis does not end within the diagnosis cycle which is set in the control system 1 according to this embodiment.

Referring to FIG. 16, in this example, the execution time of the machine learning engine 140 is included in the diagnosis cycle in the n-th cycle, but the execution time of the machine learning engine 140 is not included in the diagnosis cycle in the (n+1)-th cycle.

When the execution time is not included in the diagnosis cycle in the (n+1)-th cycle, a degree of deviation continues to be acquired in the (n+2)-th cycle. When this time excess occurs continuously two times, an event log indicating that the time excess occurs continuously two times is outputted (notifying of the time excess).

When an event log notifying of the time excess is outputted, an image for notification of the time excess and selection of a parameter is displayed on the display unit 218 of the support device 200.

Figure 17:
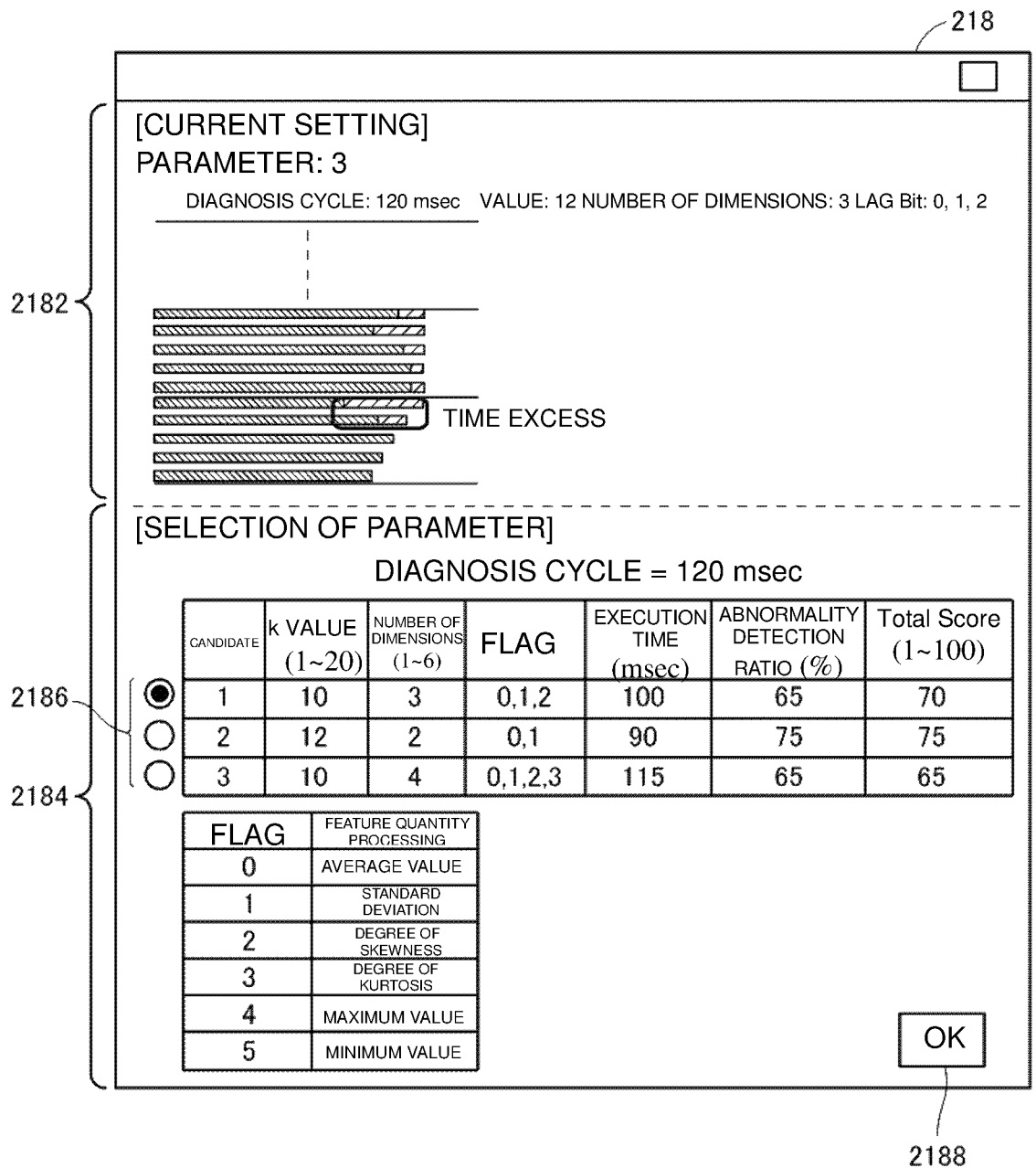
FIG. 17 is a diagram illustrating an example of an image which is displayed on a support device in the control system according to the embodiment.

FIG. 17 is a diagram illustrating an example of an image which is displayed on the support device 200 in the control system 1 according to this embodiment.

Referring to FIG. 17, a setting image 2182 indicating a current setting state and a selection image 2184 for selecting a parameter are displayed on the display unit 218 of the support device 200.

Setting details of Parameter 3 which is currently set are displayed in the setting image 2182. Data indicating the time excess is graphically displayed in the setting image 2182. Specifically, a relationship between the time required for acquiring the degree of deviation by the machine learning engine 140 and the diagnosis cycle is graphically displayed.

Setting details of Parameters 4 to 6 in which the execution time of the machine learning engine 140 is included in the diagnosis cycle in the candidate list illustrated in FIG. 15A-15B are displayed in the selection image 2184. In displaying the setting details, the abnormality detection parameters are displayed as Candidates 1 to 3 in the order of descending Total Scores. In this way, candidates for the abnormality detection parameters capable of shortening the acquisition time of the degree of deviation are displayed depending on the priorities based on the acquisition time of the degree of deviation by the machine learning engine 140.

Radio buttons 2186 for selecting one abnormality detection parameter of Candidates 1 to 3 and OK button 2188 for confirming the selection are displayed in the selection image 2184. A user can confirm one abnormality detection parameter by selecting a desired abnormality detection parameter from among Candidates 1 to 3 by using the radio buttons 2186 and clicking the OK button 2188.

In this way, one abnormality detection parameter is determined in the setting process and the operating process is performed using the determined abnormality detection parameter. When an abnormality of time excess occurs in the operating process, abnormality detection parameters which are not used in the candidate list created in the setting process are outputted as choices. A user can set one abnormality detection parameter by selecting a desired parameter in the candidates for the abnormality detection parameters displayed in the selection image 2184. In this way, a user can set one abnormality detection parameter such that the execution time of the machine learning engine 140 is included in (within) the preset diagnosis cycle. That is, a user can adjust a period of time required to detect an abnormality occurring in a control object.

K. Modified Examples

In the control system 1 according to this embodiment, one abnormality detection parameter is automatically determined in the setting step, but a user may determine one abnormality detection parameter using the support device 200. A user may determine one abnormality detection parameter using the support device 200 in some situations and the support device 200 may automatically determine one abnormality detection parameter in other situations.

In the control system 1 according to this embodiment, a user can determine at least one of the first parameter, the second parameter, and the third parameter, but the user may determine only one parameter thereof and the support device 200 may automatically determine the other parameters. In addition to the diagnosis cycle, the k value, and the number of dimensions as the abnormality detection parameters, a user may determine another parameter capable of adjusting a period of time required to detect an abnormality occurring in a control object.

In the control system 1 according to this embodiment, when an abnormality of time excess occurs in the operating process, a user selects one abnormality detection parameter. However, when an abnormality of time excess occurs in the operating process, the support device 200 may automatically determine the abnormality detection parameter such that the execution time of the machine learning engine 140 is included in the diagnosis cycle.

In the control system 1 according to this embodiment, a user selects one abnormality detection parameter in the candidate list created in the setting process when an abnormality of time excess occurs, but a user may freely change the values of the abnormality detection parameters.

Figure 18:
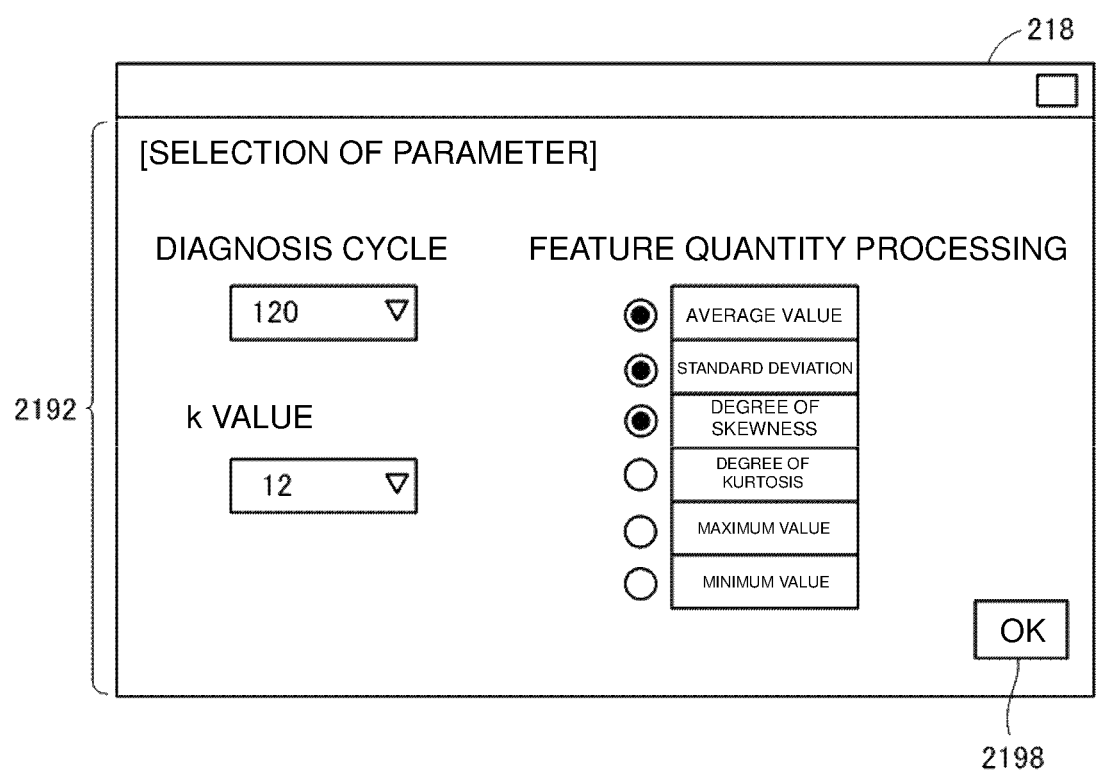
FIG. 18 is a diagram illustrating an example of a screen which is displayed on the support device in the control system according to the embodiment.

For example, FIG. 18 is a diagram illustrating an example of a screen which is displayed on the support device 200 in the control system 1 according to this embodiment. Referring to FIG. 18, a selection image 2192 for selecting a parameter is displayed on the display unit 218 of the support device 200.

The diagnosis cycle, the k value, and selection items of feature quantity processing (the number of dimensions) are displayed in the selection image 2192. A user can confirm one abnormality detection parameter by selecting a desired value as the abnormality detection parameter using the selection items and clicking an OK button 2198. In this way, a user can freely change the value of the abnormality detection parameter.

With the control system 1 according to the embodiment, a user can set abnormality detection parameters such as a diagnosis cycle, a k value, and the number of dimensions. Accordingly, the user can adjust a period of time required for detecting an abnormality occurring in a control object by setting values of the parameters.

According to one or some embodiments, the instruction means instructs the deviation acquiring means to start execution on the basis of a third parameter associated with the execution cycle of the deviation acquiring means. A value of the third parameter is changeable.

According to one or some embodiments, the control system further includes output means that outputs a period of time required for the deviation acquiring means to acquire the degree of deviation.

According to one or some embodiments, the output means outputs candidates, which is able to shorten the period of time required for the deviation acquiring means to acquire the degree of deviation, of the value from the value of at least one of the first parameter and the second parameter.

According to one or some embodiments, the output means outputs candidates, which is able to shorten the period of time required for the deviation acquiring means to acquire the degree of deviation, of the value according to a priority order based on at least a period of time in which the degree of deviation is acquired by the deviation acquiring means.

According to one or some embodiments, the output means outputs candidates, which is able to shorten the period of time required for the deviation acquiring means to acquire the degree of deviation, of the value when the period of time required for the deviation acquiring means to acquire the degree of deviation is not included in the execution cycle of the deviation acquiring means.

According to one or some embodiments, the control system further includes determination means that determines, from the value of at least one of the first parameter and the second parameter, candidates of the value with which the period of time required for the deviation acquiring means to acquire the degree of deviation is included in the execution cycle of the deviation acquiring means.

According to one or some embodiments, a user program that defines the feature quantity creating means, the abnormality detecting means, and the instruction means is repeatedly executed for each predetermined system cycle, and a machine program that defines the deviation acquiring means is executed in a period of time in which the user program is not executed.

According to one or some embodiments, the control system further includes preliminary storage means that stores the group of feature quantities of data which is acquired from the control object in the storage means in advance before the degree of deviation is acquired by the deviation acquiring means.

The above-disclosed embodiments should be understood to be merely exemplary, but not restrictive in all embodiments. The scope of the disclosure is defined by the appended claims, not by the above description, and is intended to include all modifications within meanings and scopes equivalent to the scope of the claims.

What is claimed is:

1. A control system comprising:
   a control device that controls a control object;
   storage device that stores a group of feature quantities which are generated from data acquired from the control object and which are defined by one or more elements, wherein the control device comprises a processor which is configured to execute programs to implement a control method, wherein
   the processor creates a feature quantity from data which is acquired from the control object on the basis of a first parameter associated with the number of elements defining the feature quantity,
   wherein the processor acquires a degree of deviation between the created feature quantity and the group of feature quantities stored by the storage device on the basis of a second parameter associated with a range in the group of feature quantities which is used to acquire the degree of deviation,
   wherein the processor detects an abnormality occurring in the control object on the basis of the acquired degree of deviation and a threshold value,
   wherein the processor instructs to start an execution of the operation of acquiring the degree of deviation on the basis of an execution cycle of the operation of acquiring the degree of deviation,
   wherein a value of at least one of the first parameter and the second parameter is changeable,
   wherein the processor outputs a period of time required for the operation of acquiring the degree of deviation,
   wherein the processor outputs one or more candidates, which are able to shorten the period of time required for the operation of acquiring the degree of deviation, from the value of at least one of the first parameter and the second parameter.

2. The control system according to claim 1, wherein the processor instructs to start the execution of the operation of acquiring the degree of deviation on the basis of a third parameter associated with the execution cycle of the operation of acquiring the degree of deviation, and
   wherein a value of the third parameter is changeable.

3. The control system according to claim 2, wherein the processor determines, from the value of at least one of the first parameter and the second parameter, the one or more candidates with which the period of time required for the operation of acquiring the degree of deviation enters the execution cycle of the operation of acquiring the degree of deviation.

4. The control system according to claim 2, wherein a user program that defines the operation of creating the feature quantity, the operation of detecting the abnormality occurring in the control object, and the operation of instructing to start the execution of the operation of acquiring the degree of deviation is repeatedly executed for each predetermined system cycle, and
   wherein a machine program that defines the operation of acquiring the degree of deviation is executed in a period of time in which the user program is not executed.

5. The control system according to claim 2, wherein the processor stores the group of feature quantities of data which is acquired from the control object in the storage device in advance before the degree of deviation is acquired.

6. The control system according to claim 1, wherein the processor outputs the one or more candidates, which are able to shorten the period of time required for the operation of acquiring the degree of deviation, according to a priority order based on at least a period of time in which the degree of deviation is acquired.

7. The control system according to claim 6, wherein the processor outputs the one or more candidates, which are able to shorten the period of time required for the operation of acquiring the degree of deviation, when the period of time required for the operation of acquiring the degree of deviation does not enter the execution cycle of the operation of acquiring the degree of deviation.

8. The control system according to claim 1, wherein the processor outputs the one or more candidates, which are able to shorten the period of time required for the operation of acquiring the degree of deviation, when the period of time required for the operation of acquiring the degree of deviation does not enter the execution cycle of the operation of acquiring the degree of deviation.

9. The control system according to claim 8, wherein the processor determines, from the value of at least one of the first parameter and the second parameter, the one or more candidates with which the period of time required for the operation of acquiring the degree of deviation to acquire the degree of deviation enters the execution cycle of the operation of acquiring the degree of deviation.

10. The control system according to claim 9, wherein a user program that defines the operation of creating the feature quantity, the operation of detecting the abnormality occurring in the control object, and operation of instructing to start the execution of the operation of acquiring the degree of deviation is repeatedly executed for each predetermined system cycle, and wherein a machine program that defines the operation of acquiring the degree of deviation is executed in a period of time in which the user program is not executed.

11. The control system according to claim 10, wherein the processor stores the group of feature quantities of data which is acquired from the control object in the storage device in advance before the degree of deviation is acquired.

12. The control system according to claim 1, wherein the processor determines, from the value of at least one of the first parameter and the second parameter, the one or more candidates with which the period of time required for the operation of acquiring the degree of deviation enters the execution cycle of the operation of acquiring the degree of deviation.

13. The control system according to claim 1, wherein a user program that defines the operation of creating the feature quantity, the operation of detecting the abnormality occurring in the control object, and the operation of instructing to start the execution of the operation of acquiring the degree of deviation is repeatedly executed for each predetermined system cycle, and wherein a machine program that defines the operation of acquiring the degree of deviation is executed in a period of time in which the user program is not executed.

14. The control system according to claim 1, wherein the processor stores the group of feature quantities of data which is acquired from the control object in the storage device in advance before the degree of deviation is acquired.

15. A control device that controls a control object, the control device comprising:

storage device that stores a group of feature quantities which are generated from data acquired from the control object and which are defined by one or more elements; and a processor, wherein the processor executes programs to implement a control method, wherein the processor creates a feature quantity from data which is acquired from the control object on the basis of a first parameter associated with the number of elements defining the feature quantity, wherein the processor acquires a degree of deviation between the created feature quantity and the group of feature quantities stored by the storage device on the basis of a second parameter associated with a range in the group of feature quantities which is used to acquire the degree of deviation, wherein the processor detects an abnormality occurring in the control object on the basis of the acquired degree of deviation and a threshold value, wherein the processor instructs to start an execution of the operation of acquiring the degree of deviation on the basis of an execution cycle of the operation of acquiring the degree of deviation, wherein a value of at least one of the first parameter and the second parameter is changeable, wherein the processor outputs a period of time required for the operation of acquiring the degree of deviation, wherein the processor outputs one or more candidates, which are able to shorten the period of time required for the operation of acquiring the degree of deviation, from the value of at least one of the first parameter and the second parameter.

16. A control method for a control device to control a control object, wherein the control device comprises a processor executing programs to implement the control method, the control method comprising:

creating, by the processor, a feature quantity from data which is acquired from the control object on the basis of a first parameter associated with the number of elements defining the feature quantity;

acquiring, by the processor, a degree of deviation between the created feature quantity and a group of feature quantities which are stored by storage device on the basis of a second parameter associated with a range in the group of feature quantities which is used to acquire the degree of deviation;

detecting, by the processor, an abnormality occurring in the control object on the basis of the acquired degree of deviation and a threshold value;

starting, by the processor, an acquisition of the degree of deviation on the basis of an execution cycle of the acquisition of the degree of deviation, wherein a value of at least one of the first parameter and the second parameter is changeable;

outputting, by the processor, a period of time required for the operation of acquiring the degree of deviation; and outputting, by the processor, one or more candidates, which are able to shorten the period of time required for the operation of acquiring the degree of deviation, from the value of at least one of the first parameter and the second parameter.

* * * * *